(12) United States Patent
Iida et al.

(10) Patent No.: US 11,852,712 B2
(45) Date of Patent: *Dec. 26, 2023

(54) RADAR DEVICE, SIGNAL PROCESSOR, AND SIGNAL PROCESSING METHOD

(71) Applicant: SONY SEMICONDUCTOR SOLUTIONS CORPORATION, Kanagawa (JP)

(72) Inventors: Sachio Iida, Kanagawa (JP); Kenichi Kawasaki, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 124 days.

This patent is subject to a terminal disclaimer.

(21) Appl. No.: 17/387,173

(22) Filed: Jul. 28, 2021

(65) Prior Publication Data

US 2021/0356579 A1 Nov. 18, 2021

Related U.S. Application Data

(63) Continuation of application No. 16/340,902, filed as application No. PCT/JP2017/032625 on Sep. 11, 2017, now Pat. No. 11,119,203.

(30) Foreign Application Priority Data

Oct. 25, 2016 (JP) .................................. 2016-208483

(51) Int. Cl.
*G01S 13/93* (2020.01)
*G01S 13/34* (2006.01)
(Continued)

(52) U.S. Cl.
CPC ............. *G01S 13/34* (2013.01); *G01S 7/02* (2013.01); *G01S 7/352* (2013.01); *G01S 13/93* (2013.01);
(Continued)

(58) Field of Classification Search
CPC ........ G01S 13/003; G01S 13/34; G01S 13/42; G01S 13/93; G01S 13/931;
(Continued)

(56) References Cited

U.S. PATENT DOCUMENTS 5,652,589 A 7/1997 Ono
7,164,382 B2 * 1/2007 Kai ...................... G01S 7/4008
342/134

(Continued)

FOREIGN PATENT DOCUMENTS

CN 1712986 A 12/2005
CN 101313232 A 11/2008
(Continued)

OTHER PUBLICATIONS

Schmid et al., "Motion Compensation and Efficient Array Design for TDMA FMCW MIMO Radar Systems," 6th European Conference on Antennas and Propagation (EUCAP), Institute of Electrical and Electronics Engineers, 2011, pp. 1746-1750.

(Continued)

*Primary Examiner* — Timothy A Brainard
(74) *Attorney, Agent, or Firm* — Sheridan Ross PC

(57) ABSTRACT

To provide a radar device capable of improving azimuth estimation accuracy by compensating the Doppler phase shift of a moving target in a TDMA FMCW MIMO radar device. Provided is a radar device that allows transmitting antennas to perform transmission by performing sequential switching such that antenna element numbers are anterior-posterior symmetrical centering on a reference time and synthesizes a beat signal at the reference time from a first beat signal received by a receiving antenna before the reference time and a second beat signal received after the reference time.

14 Claims, 17 Drawing Sheets

(51) Int. Cl.
  *G01S 13/931* (2020.01)
  *G01S 7/35* (2006.01)
  *G01S 7/02* (2006.01)
  *H01Q 21/08* (2006.01)
  *G08G 1/16* (2006.01)

(52) U.S. Cl.
  CPC .......... *G01S 13/931* (2013.01); *H01Q 21/08* (2013.01); *G01S 7/356* (2021.05); *G08G 1/16* (2013.01)

(58) Field of Classification Search
  CPC . G01S 2013/93271; G01S 2013/93272; G01S 7/02; G01S 7/352; G01S 7/356; G08G 1/16; H01Q 21/08
  See application file for complete search history.

(56) References Cited

U.S. PATENT DOCUMENTS

| | | | |
|---|---|---|---|
| 11,119,203 B2* | 9/2021 | Iida | G01S 13/931 |
| 2008/0084351 A1 | 4/2008 | Englert | |
| 2009/0231182 A1 | 9/2009 | Nishimura et al. | |
| 2010/0075618 A1* | 3/2010 | Isaji | G01S 13/931 455/90.1 |
| 2014/0347208 A1* | 11/2014 | Schoor | G01S 7/354 342/146 |
| 2014/0347211 A1 | 11/2014 | Schoor | |
| 2015/0295628 A1 | 10/2015 | Rambach | |

FOREIGN PATENT DOCUMENTS

| | | |
|---|---|---|
| CN | 102121989 A | 7/2011 |
| CN | 102798842 A | 11/2012 |
| CN | 103282792 A | 9/2013 |
| CN | 104635228 A | 5/2015 |
| JP | H08-136647 | 5/1996 |
| JP | 2012098107 A | 5/2012 |
| JP | 2012112653 A | 6/2012 |
| JP | 2012242217 A | 12/2012 |
| WO | WO-03027708 A | 4/2003 |
| WO | WO 2008/015883 | 2/2008 |

OTHER PUBLICATIONS

International Search Report and Written Opinion for International (PCT) Patent Application No. PCT/JP2017/032625, dated Oct. 10, 2017, 5 pages.
Notice of Allowance for U.S. Appl. No. 16/340,902, dated May 7, 2021, 12 pages.
Corrected Notice of Allowance for U.S. Appl. No. 16/340,902, dated May 19, 2021, 4 pages.

* cited by examiner

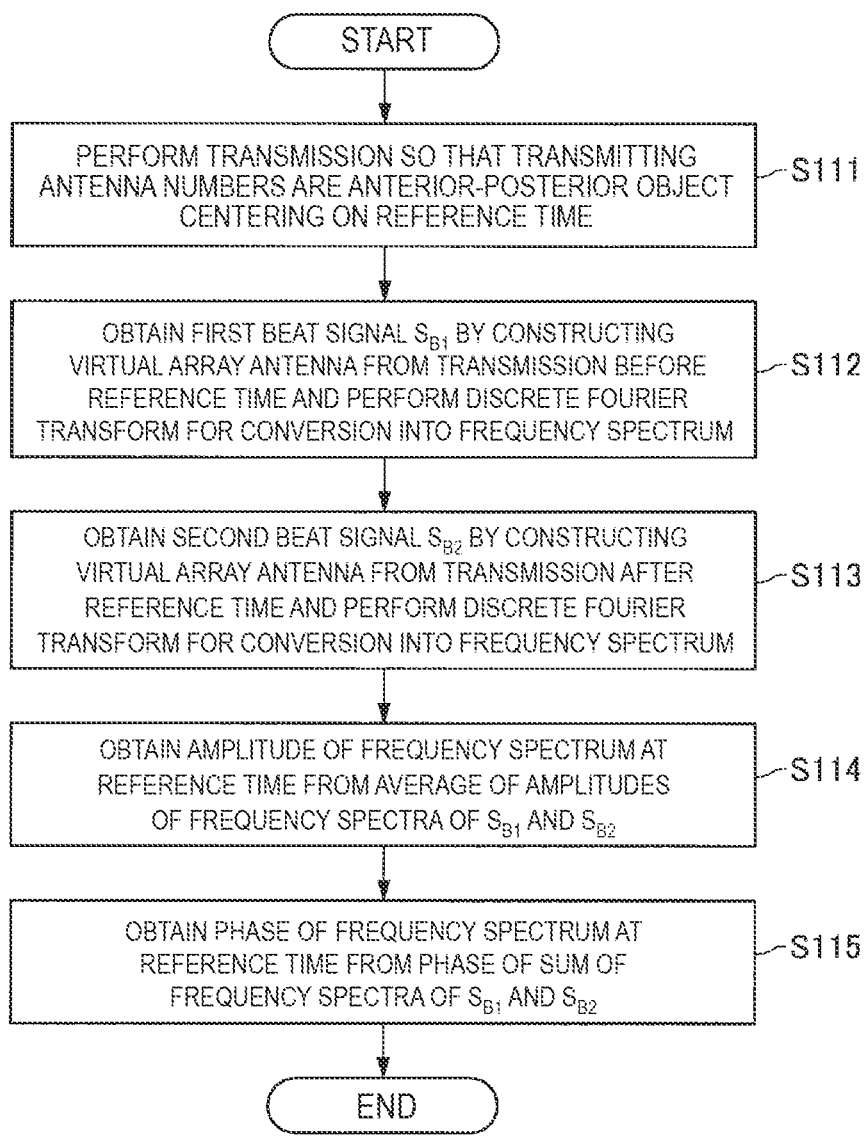

RADAR DEVICE, SIGNAL PROCESSOR, AND SIGNAL PROCESSING METHOD

CROSS REFERENCE TO RELATED APPLICATIONS

This application is a continuation of and claims priority to U.S. patent application Ser. No. 16/340,902, filed Apr. 10, 2019, which is a national stage application under 35 U.S.C. 371 and claims the benefit of PCT Application No. PCT/JP2017/032625 having an international filing date of Sep. 11, 2017, which designated the United States, which PCT application claimed the benefit of Japanese Patent Application No. 2016-208483 filed Oct. 25, 2016, the entire disclosures of each of which are incorporated herein by reference.

TECHNICAL FIELD

The present disclosure relates to a radar device, a signal processor, and a 10 signal processing method.

BACKGROUND ART

Time-division multiple access (TDMA) frequency-modulated continuous-wave (FMCW) multiple-input multiple-output (MIMO) radar devices are used in some cases as an in-vehicle radar mounted in an automotive vehicle.

The FMCW scheme is a technique that emits a chirp signal whose frequency increases or decreases linearly with time as a transmission signal from a transmitting antenna, captures an echo signal reflected back from a target by a receiving antenna, changes the frequency of a local signal during the round trip time from when the transmitted signal is reflected back by the target to when it returns in multiplying the echo signal and the local signal having the same frequency as the transmission signal by a mixer, and performs the range measurement by using the generation of a beat signal of the frequency proportional to the distance to the target. Then, the TDMA FMCW MIMO scheme is a technique that transmits a chirp signal M times by sequentially selecting one antenna from an M-element transmitting array antenna, simultaneously receives it by an N-element receiving array antenna, and uses the fact that it can be regarded as a radar device receiving it by a virtual array antenna of M*N elements, thereby performing the angle measurement with improved azimuth resolution, in addition to the range measurement by the FMCW scheme.

In the TDMA FMCW MIMO radar device, it is known that the angle measurement accuracy deteriorates due to the Doppler phase shift in a case where the target and the radar device are moving relatively. Thus, in one example, Non-Patent Literature 1 discloses a technique of constructing a virtual array antenna of M*N−L elements so that at least L antenna elements overlap and obtaining the Doppler phase shift from a difference in phases of beat signals received by overlapped antenna elements to compensate it.

CITATION LIST

Non-Patent Literature

Non-Patent Literature 1: "*Motion Compensation and Efficient Array Design for TDMA FMCW MIMO Radar devices*", by C. M. Schmid; R. Feger; C. Pfeffer; A. Stelzer, Eucap 2012

DISCLOSURE OF INVENTION

Technical Problem

However, in the method disclosed in Non-Patent Literature 1, the Doppler phase shift of the entire virtual array antenna is compensated from the beat signal received by the few overlapped antenna elements, so slight noise have a largely influence on the azimuth estimation accuracy. Furthermore, overlapping of the antenna elements reduces the number of elements of the virtual array antenna, so the azimuth resolution is lowered.

In view of this, the present disclosure provides a novel and improved radar device, signal processor, and signal processing method, capable of improving azimuth estimation accuracy by compensating the Doppler phase shift of a moving target in the TDMA FMCW MIMO radar devices.

Solution to Problem

According to the present disclosure, there is provided a radar device including: M (M≥2) number of transmitting antennas; N (N≥1) number of receiving antennas; a local oscillator configured to oscillate a local signal; a transmission processing unit configured to transmit a transmission signal based on the local signal by selecting any one of the transmitting antennas; a reception processing unit configured to output a beat signal from an echo signal obtained from the transmission signal reflected by a target and the local signal, the echo signal being received by the receiving antennas; and a signal processing unit configured to perform signal processing on the beat signal. The transmission processing unit allows the transmitting antennas to perform transmission by performing sequential switching such that antenna element numbers are anterior-posterior symmetrical centering on a reference time, and the signal processing unit synthesizes a beat signal at the reference time from a first beat signal received by the receiving antenna before the reference time and a second beat signal received after the reference time.

Moreover, according to the present disclosure, there is provided a signal processor including: a signal processing unit configured to perform signal processing on a beat signal generated from an echo signal obtained from a transmission signal that is transmitted from M (M≥2) number of transmitting antennas and reflected by a target and a local signal, the transmission signal being based on the local signal. The signal processing unit causes the transmitting antennas to perform transmission by performing sequential switching such that antenna element numbers are anterior-posterior symmetrical centering on a reference time, and synthesizes a beat signal at the reference time from a first beat signal received by the receiving antenna before the reference time and a second beat signal received after the reference time.

Moreover, according to the present disclosure, there is provided a signal processing method including: causing M (M≥2) number of transmitting antennas to transmit a transmission signal based on a local signal by performing sequential switching such that antenna element numbers are anterior-posterior symmetrical centering on a reference time; and performing signal processing on a beat signal generated from an echo signal obtained from the transmission signal that is transmitted from the transmitting antennas and reflected by a target and the local signal. The performing of the signal processing includes synthesizing a beat signal at the reference time from a first beat signal received by the receiving antenna before the reference time and a second beat signal received after the reference time.

Advantageous Effects of Invention

According to the present disclosure as described above, it is possible to provide a novel and improved radar device, signal processor, and signal processing method, capable of improving azimuth estimation accuracy by compensating the Doppler phase shift of a moving target in the TDMA FMCW MIMO radar devices.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is a flowchart illustrating an operation example of the FMCW TDMA MIMO radar device 100 according to the embodiment of the present disclosure.

MODE(S) FOR CARRYING OUT THE INVENTION

Figure 1:
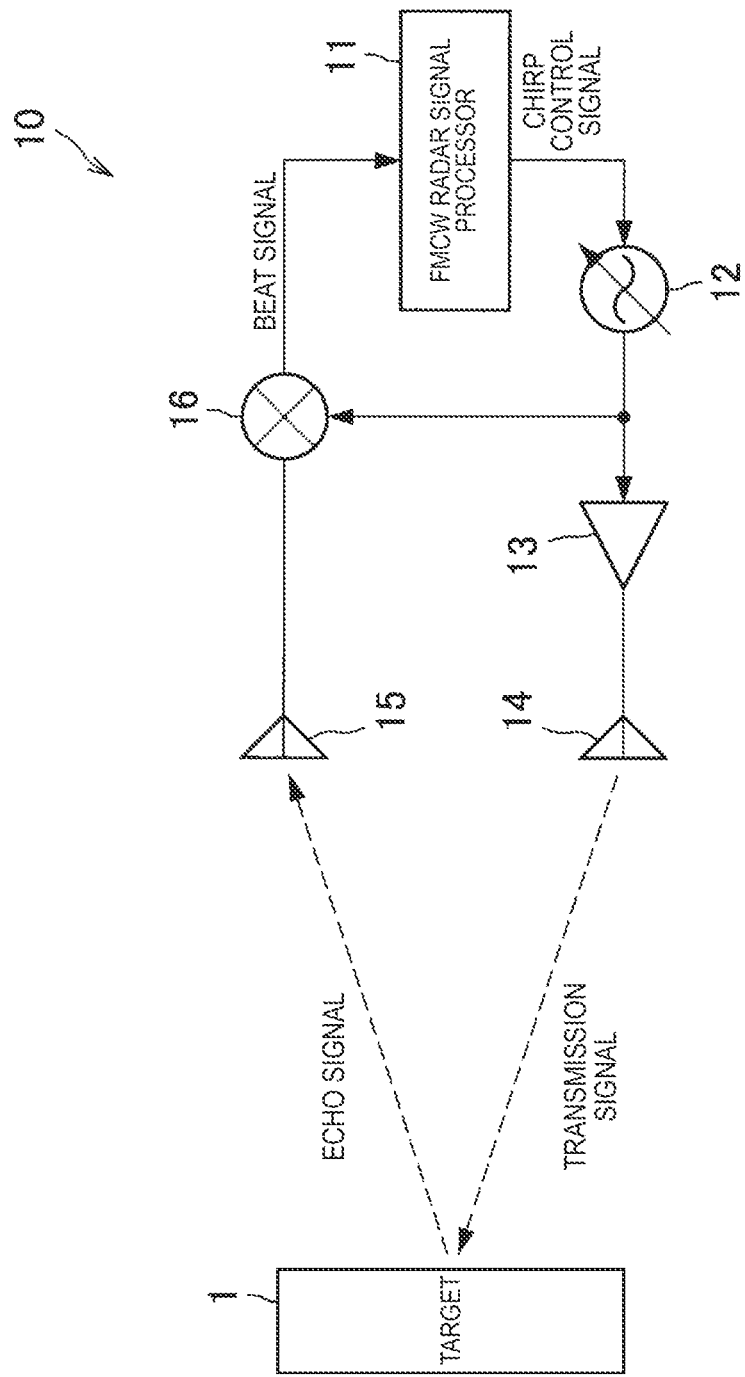
FIG. 1 is a diagram illustrated to describe a configuration example of an FMCW radar device.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description will be given in the order below.
1. Embodiments of present disclosure
1.1. Overview
1.2. First embodiment
1.3. Second embodiment
1.4. Third embodiment
1.5. Fourth embodiment
1.6. Application example
2. Concluding remarks

1. EMBODIMENTS OF PRESENT DISCLOSURE 1.1. Overview

An overview of embodiments of the present disclosure is first described, and then embodiments of the present disclosure are described in detail.

As described above, the TDMA FMCW MIMO radar devices are used in some cases as the in-vehicle radar mounted in an automotive vehicle. The FMCW scheme is first described.

The FMCW scheme is a technique that emits a chirp signal whose frequency increases or decreases linearly with time as a transmission signal from a transmitting antenna, captures an echo signal reflected back from a target by a receiving antenna, changes a frequency of a local signal during the round trip time from when the transmitted signal is reflected back by the target to when it returns in multiplying the echo signal and the local signal having the same frequency as the transmission signal by a mixer, and performs the range measurement by using the generation of a beat signal of the frequency proportional to the distance to the target.

FIG. 1 is a diagram illustrated to describe a configuration example of an FMCW radar device. As illustrated in FIG. 1, in the FMCW radar device 10, a local oscillator 12 outputs a local signal whose frequency increases or decreases linearly with time on the basis of a chirp control signal sent from an FMCW radar signal processor 11. The local signal that is output from the local oscillator 12 is amplified in a power amplifier 13 and then is emitted from a transmitting antenna 14 as a transmission signal.

The transmission signal emitted from the transmitting antenna 14 is reflected by a target 1. A receiving antenna 15 receives an echo signal reflected back by the target 1. The echo signal received by the receiving antenna 15 is multiplied by the local signal that is output from the local oscillator 12 in a mixer 16 and becomes a beat signal. The beat signal is sent to the FMCW radar signal processor 11 and is used for measurement of a range to the target 1.

Figure 2:
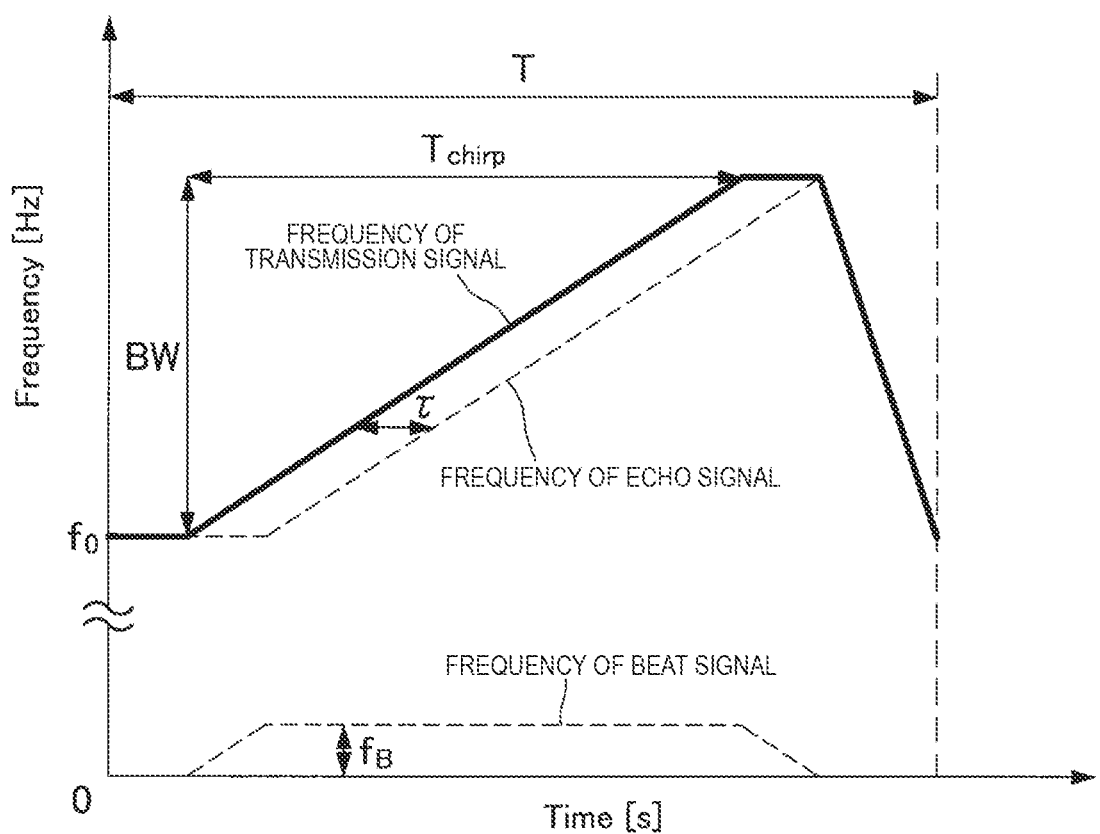
FIG. 2 is a diagram illustrated to describe an example of a frequency of a transmission signal transmitted by an FMCW radar device 10, a frequency of an echo signal, and a frequency of a beat signal, which change with time.

FIG. 2 is a diagram illustrated to describe an example of a frequency of the transmission signal transmitted by the FMCW radar device 10, a frequency of the echo signal, and a frequency of the beat signal, which change with time. In the example illustrated in FIG. 2, the frequency of the transmission signal increases linearly with time from $f_0$ to $f_0+BW$. The echo signal is delayed by the round trip time $\tau$ from when the transmission signal is reflected by the target 1 to when it returns. The frequency $f_B$ of the beat signal is proportional to the round trip time $\tau$ from when the transmission signal is reflected by the target 1 to when it returns. Thus, it can be said that the FMCW scheme is a technique allowing for getting to know the range to the target 1 in a measurement cycle T by obtaining the frequency $f_B$ of the beat signal.

Then, the TDMA FMCW MIMO scheme is a technique that transmits a chirp signal M times by sequentially selecting one antenna from an M-element transmitting array antenna, simultaneously receives it by an N-element receiving array antenna, and uses the fact that it can be regarded as a radar device receiving it by a virtual army antenna of M*N elements, thereby performing the angle measurement with improved azimuth resolution, in addition to the range measurement by the FMCW scheme.

Figure 3:
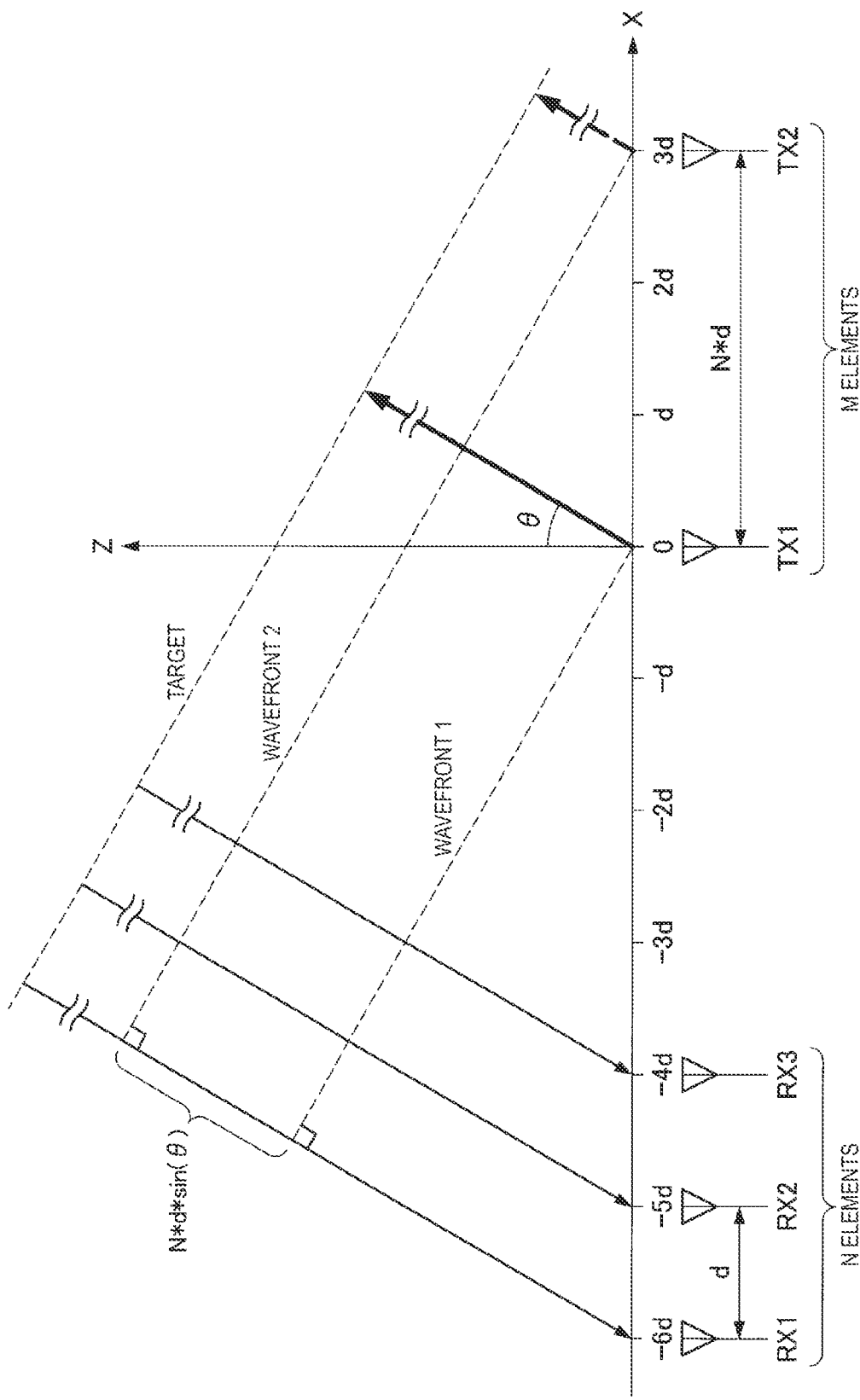
FIG. 3 is a diagram illustrated to describe a configuration example of an array antenna of an MIMO radar device.

FIG. 3 is a diagram illustrated to describe a configuration example of an array antenna of an MIMO radar device. In the example illustrated in FIG. 3, a receiving array antenna is N elements and the spacing between elements is d. A transmitting array antenna is M elements and the spacing between elements is N*d. Although the target is situated on the azimuth of the angle θ from the Z axis and is shown as being in the vicinity of the array antenna for convenience of description in FIG. 3, the target is actually located at a distance of 1000 times or more with respect to a wavelength of 3.9 mm at 77 GHz used by the in-vehicle radar. Thus, the propagation of electromagnetic wave between the array antenna and the target can approximate to a plane wave.

Figure 4:
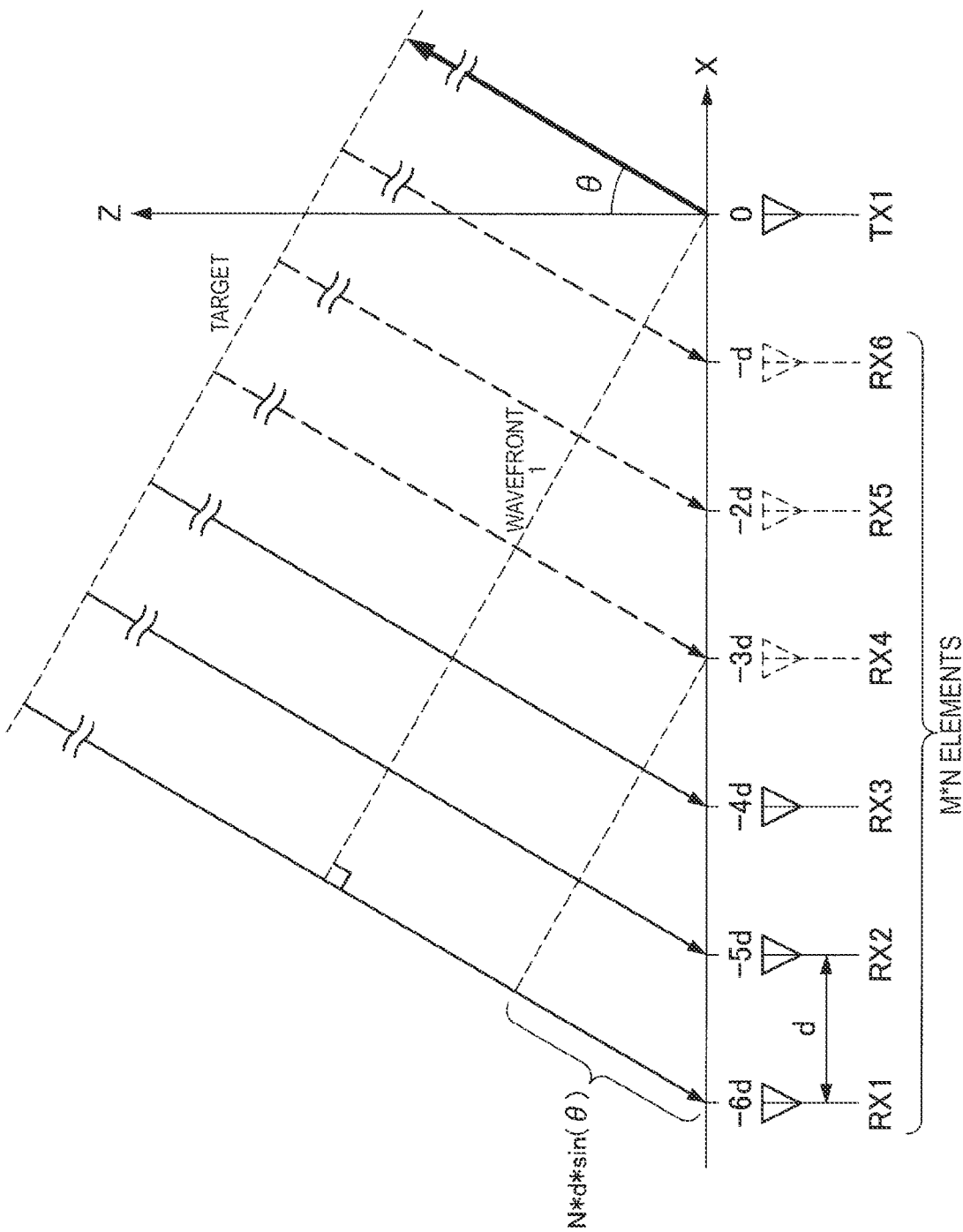
FIG. 4 is a diagram illustrated to describe a virtual array antenna.

First, when transmission is performed from a transmitting antenna TX1, the transmission signal propagates from a wavefront 1 to the target, and the echo signal propagates from the target to receiving antennas RX1, RX2, and RX3, Next, when transmission is performed from a transmitting antenna TX2, the transmission signal propagates from a wavefront 2 to the target, and the echo signal propagates from the target to the receiving antennas RX1, RX2, and RX3. In a case where the transmission is performed from the transmitting antenna TX2, the propagation distance to the target is shortened by the range N*d*sin(θ) between the wavefront 1 and the wavefront 2. FIG. 4 is a diagram illustrated to describe a virtual array antenna, and the range between the wavefront 1 and the wavefront 2 is the same as the difference between the propagation distances of RX1 and RX4 illustrated in FIG. 4. In other words, in a case where the transmission is performed from the transmitting antenna TX2, it is equivalent to being transmitted from the transmitting antenna TX1 and received by the receiving antennas RX4, RX5, and RX6. Thus, the transmission from the transmitting antennas TX1 and TX2 constructs the virtual array antenna including the receiving antennas RX1, RX2, RX3, RX4, RX5, and RX6.

Here, mode vectors of the transmitting array antenna and the receiving array antenna corresponding to the case where M=2 and N=3 in FIG. 3 are expressed by Formula 1 and Formula 2. In these formulas, $f_0$ is the frequency of the transmission signal, d is between receiving antennas, θ is the azimuth of the target, and $c_0$ is the velocity of light. In addition, Formula 3 is the mode vector of the virtual array antenna corresponding to FIG. 4, and becomes the Kronecker product of the transmission mode vector and the reception mode vector.

[Math. 1]

$$a_{TX}(\theta) = \begin{bmatrix} \exp\left(j2\pi f_0 \frac{0 d\sin(\theta)}{c_0}\right) \\ \exp\left(j2\pi f_0 \frac{3 d\sin(\theta)}{c_0}\right) \end{bmatrix} \quad \text{(Formula 1)}$$

[Math. 2]

$$a_{RX}(\theta) = \begin{bmatrix} \exp\left(j2\pi f_0 \frac{0 d\sin(\theta)}{c_0}\right) \\ \exp\left(j2\pi f_0 \frac{1 d\sin(\theta)}{c_0}\right) \\ \exp\left(j2\pi f_0 \frac{2 d\sin(\theta)}{c_0}\right) \end{bmatrix} \quad \text{(Formula 2)}$$

[Math. 3]

$$a_{MIMO}(\theta) = a_{TX}(\theta) \otimes a_{RX}(\theta) = \begin{bmatrix} \exp\left(j2\pi f_0 \frac{0 d\sin(\theta)}{c_0}\right) \\ \exp\left(j2\pi f_0 \frac{1 d\sin(\theta)}{c_0}\right) \\ \exp\left(j2\pi f_0 \frac{2 d\sin(\theta)}{c_0}\right) \\ \exp\left(j2\pi f_0 \frac{3 d\sin(\theta)}{c_0}\right) \\ \exp\left(j2\pi f_0 \frac{4 d\sin(\theta)}{c_0}\right) \\ \exp\left(j2\pi f_0 \frac{5 d\sin(\theta)}{c_0}\right) \end{bmatrix} \quad \text{(Formula 3)}$$

As described above, the MIMO radar device is a radar device that constructs the virtual array antenna including a plurality of elements using the transmitting array antenna and the receiving array antenna. In particular, an FMCW TDMA MIMO radar device is a radar device that performs range measurement and angle measurement by switching a plurality of transmitting antennas in time division and sequentially transmitting FMCW-based chirp signals.

Figure 5:
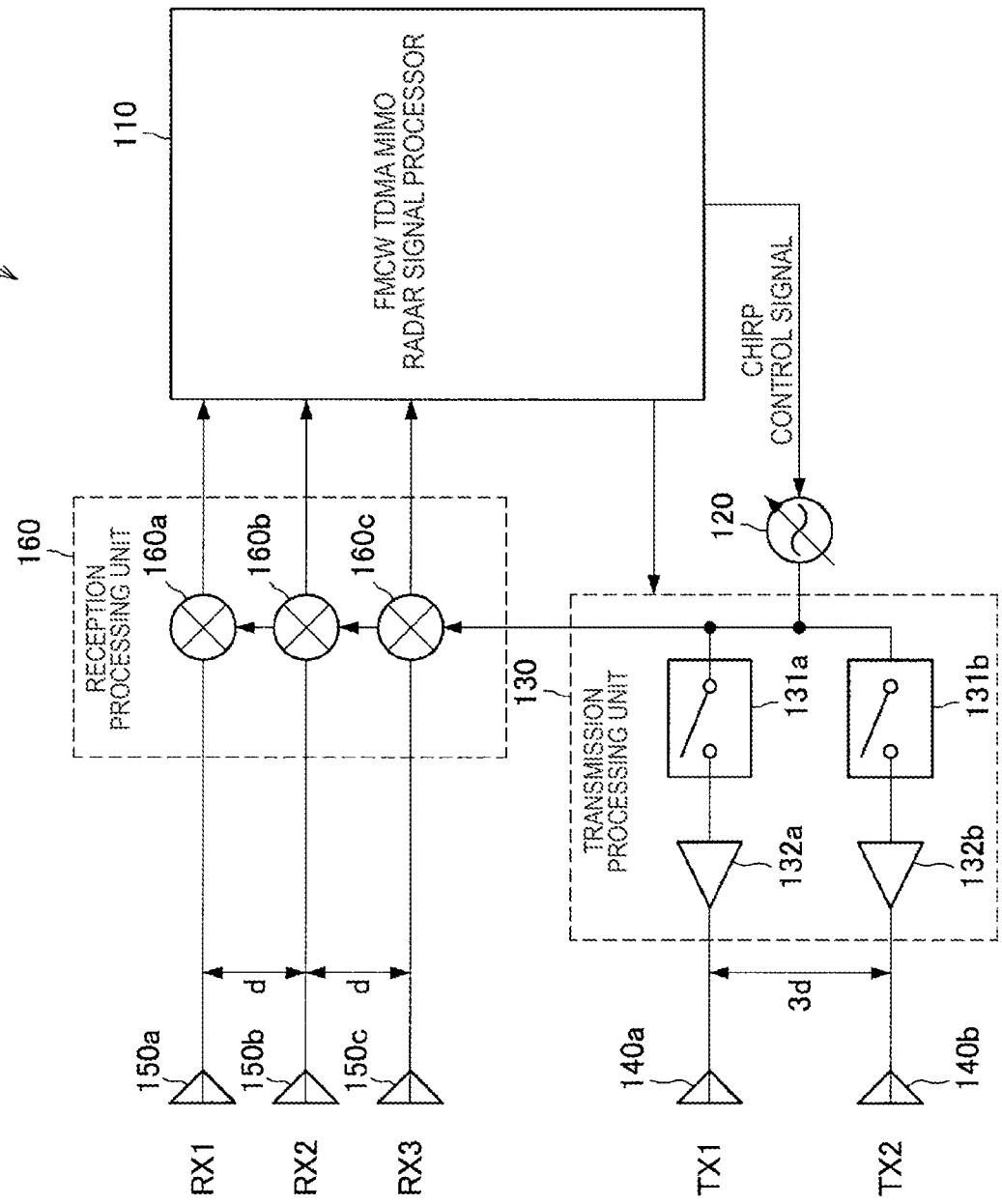
FIG. 5 is a diagram illustrated to describe a configuration example of an FMCW TDMA MIMO radar device.

FIG. 5 is a diagram illustrated to describe a configuration example of an FMCW TDMA MIMO radar device. The FMCW TDMA MIMO radar device 100 illustrated in FIG. 5 includes an FMCW TDMA MIMO radar signal processor 110, a local oscillator 120, a transmission processing unit 130, transmitting antennas 140a and 140b, receiving antennas 150a, 150b, and 150c, and a reception processing unit 16t.

The FMCW TDMA MIMO radar signal processor 110 is a device that performs various signal processing in the operation of the FMCW TDMA MIMO radar device 100. In one example, the FMCW TDMA MIMO radar signal processor 110 sends a chirp control signal to the local oscillator 120 and sends a switching control signal used to control the transmission processing unit 130 so that it outputs the transmission signal. In addition, the FMCW TDMA MIMO radar signal processor 110 measures a range to the target using a beat signal that is output from the reception processing unit 160.

The local oscillator 120 outputs a local signal whose frequency increases or decreases linearly with time on the basis of the chirp control signal sent from the FMCW TDMA MIMO radar signal processor 110. The local oscillator 120 sends the generated local signal to the transmission processing unit 130 and the reception processing unit 160.

The transmission processing unit 130 performs processing for allowing the local signal that is sent from the local oscillator 120 to be sent as a transmission signal from the transmitting antennas 140*a* and 140*b*. The transmission processing unit 130 includes switches 131*a* and 131*b* and power amplifiers 132*a* and 132*b*. The switches 131*a* and 131*b* are switches turned on and off in response to the signal from the FMCW TDMA MIMO radar signal processor 110. In other words, when the switches 131*a* and 131*b* are turned on, the local signal is sent to the power amplifiers 132*a* and 132*b*. The power amplifiers 132*a* and 132*b* amplify by a predetermined amount the local signal sent from the local oscillator 120.

The transmitting antennas 140*a* and 140*b* respectively emit the local signals amplified by the power amplifiers 132*a* and 132*b* as transmission signals in the air. In the example illustrated in FIG. 5, two transmitting antennas 140*a* and 140*b* are shown, and the number of switches or power amplifiers in the transmission processing unit 130 corresponds to the number of the transmitting antennas.

The receiving antennas 150*a*, 150*b*, and 150*c* receive the echo signal reflected back by the target. In the example illustrated in FIG. 5, three receiving antennas 150*a*, 150*b*, and 150*c* are shown.

The reception processing unit 160 multiplies the echo signals received by the receiving antennas 150*a*, 150*b*, and 150*c* by the local signal output from the local oscillator 120 to generate the beat signals. The reception processing unit 160 includes mixers 161*a*, 161*b*, and 161*c* that multiply the echo signals by the local signal.

Figure 6:
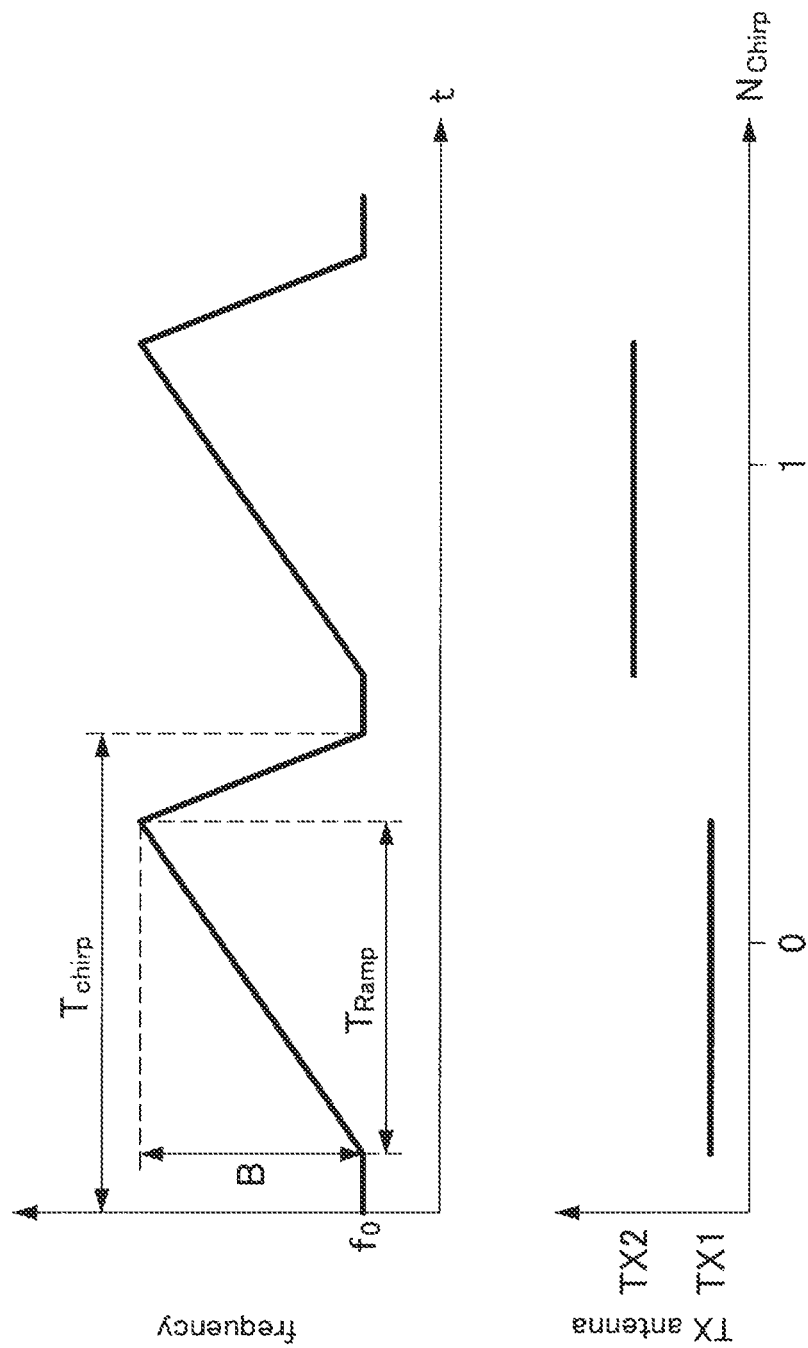
FIG. 6 is a diagram illustrated to describe a relationship between a chirp by a local oscillator of an FMCW TDMA MIMO radar device 100 and timing of selecting transmitting antennas 140$a$ and 140$b$ using switches 131$a$ and 131$b$.

FIG. 6 is a diagram illustrated to describe the relationship between the chirp by the local oscillator of the FMCW TDMA MIMO radar device 100 and the timing of selecting the transmitting antennas 140*a* and 140*b* by the switches 131*a* and 131*b*. $T_{Chirp}$ is one cycle of chirp, $T_{Ramp}$ is ramp time of chirp, $f_0$ is chirp start frequency, B is chirp bandwidth, and $N_{Chirp}$ is an index representing the correlation of chirp. In addition, TX1 corresponds to the transmitting antenna 140*s*, and TX2 corresponds to the transmitting antenna 140*b*.

Figure 7:
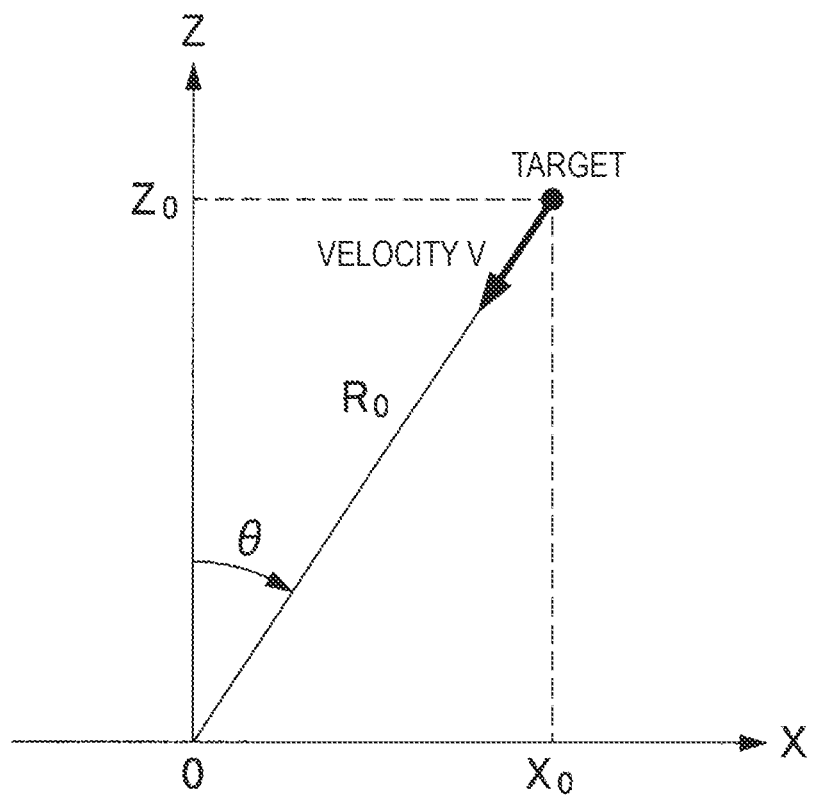
FIG. 7 is a diagram illustrated to describe the position of a target on a coordinate axis.

In a case where the target is moving, it is generally known that the Doppler phase shift occurs. FIG. 7 is a diagram illustrated to describe the position of a target on the coordinate axis. The origin of the coordinates in FIG. 7 corresponds to the position of the FMCW TDMA MIMO radar device 100. As illustrated in FIG. 7, it is assumed that there is one target at coordinates $(X_0, Z_0)$, an azimuth of θ, and a range of $R_0$, and the target is approaching the FMCW TDMA MIMO radar device 100 at velocity V in θ direction. In this case, the beat signal received by the virtual array antenna of the FMCW TDMA MIMO radar device 100 is given to Formula 4. In Formula 4, A is the amplitude of the beat signal, $f_R$ is the beat frequency proportional to the range $R_0$ as expressed in Formula 5, and $f_D$ is the Doppler frequency proportional to the velocity V as expressed in Formula 6.

[Math. 4]

$$S_B = A \cdot a_{TX}(\theta) \otimes a_{RX}(\theta) \cdot \exp\left[j2\pi\left\{(f_R - f_D)t + f_0 \frac{2(R_0 - VT_{Chirp})}{c_0}\right\}\right] \quad \text{(Formula 4)}$$

[Math. 5]

$$f_R = \frac{B}{T_{Ramp}} \frac{2(R_0 - VT_{Chirp})}{c_0} \approx \frac{B}{T_{Ramp}} \frac{2R_0}{c_0} \quad \text{(Formula 5)}$$

[Math. 6]

$$f_D = f_0 \frac{2V}{c_0} \quad \text{(Formula 6)}$$

The term including the velocity V in Formula 4 is a term representing the Doppler phase shift, and indicates a difference in phases caused by motion of the target at the velocity V during $T_{Chirp}$ that is a time difference between transmission from the TX1 (the transmitting antenna 140*a*) and transmission from the TX2 (the transmitting antenna 140*b*) and by a slight change in the propagation distance.

Moreover, although $f_R$ in Formula 5 also has a term including velocity V, even if the velocity V is 100 m/s (=360 km/h) at high velocity, in the case where $T_{Chirp}$ is a short time of approximately 10 μs, the change in the round trip distance is only 2 mm, which is much smaller than the ranging resolution of the FMCW TDMA MIMO radar device 100, so this term can be neglected.

Thus, the term of the Doppler phase shift in Formula 4 can be rewritten as expressed in Formula 7 and Formula 8 by transposing it to the mode vector of the transmitting array antenna.

[Math. 7]

$$s_B \approx A \cdot a'_{TX}(\theta) \otimes a_{RX}(\theta) \cdot \exp\left[j2\pi\left\{(f_R - f_D)t + f_B \frac{2R_0}{c_0}\right\}\right] \quad \text{(Formula 7)}$$

[Math. 8]

$$a'_{TX}(\theta) = \begin{bmatrix} \exp\left(-j4\pi f_0 \frac{0VT_{Chirp}}{c_0}\right)\exp\left(j2\pi f_0 \frac{0d\sin(\theta)}{c_0}\right) \\ \exp\left(-j4\pi f_0 \frac{1VT_{Chirp}}{c_0}\right)\exp\left(j2\pi f_0 \frac{3d\sin(\theta)}{c_0}\right) \end{bmatrix} \quad \text{(Formula 8)}$$

It is obvious that, from Formulas 7 and 8, the FMCW TDMA MIMO radar device modulates the mode vector of the transmitting array antenna with the Doppler phase shift proportional to the velocity in the case where the target is moving, so the angle measurement accuracy of the azimuth deteriorates.

Thus, in one example, Non-Patent Literature 1 discloses the technique that constructs a virtual array antenna of M*N−L elements so that at least L antenna elements overlap and obtains the Doppler phase shift from a difference in phases of beat signals received by overlapped antenna elements to compensate it. However, in the method disclosed in Non-Patent Literature 1, the Doppler phase shift of the entire virtual array antenna is compensated from the beat signal received by the few overlapped antenna elements, so slight noise have a largely influence on the azimuth estimation accuracy. Furthermore, the number of elements of the virtual array antenna is reduced by overlapping the antenna elements, so the azimuth resolution is lowered.

Thus, in view of the above-mentioned points, those who conceived the present disclosure have conducted intensive studies on the technology capable of eliminating the influence based on the motion of a target easily and with no reduction in accuracy in the FMCW TDMA MIMO radar device. Accordingly, those who conceived the present disclosure have devised the technology capable of performing repetitive transmission so that the antenna element numbers of the transmitting array antennas are anterior-posterior symmetrical centering on the reference time and synthesizing the beat signals at the reference time from the beat signal before the reference time and the beat signal after the reference time in the FMCW TDMA MIMO radar device, thereby eliminating the influence based on the motion of a target, as described below.

The overview of the embodiments of the present disclosure is described above. The embodiments of the present disclosure are now described in detail.

1.2. First Embodiment

A first embodiment of the present disclosure is first described. The configuration example of the FMCW TDMA MIMO radar device uses the same configuration as that illustrated in FIG. 5 in describing the first embodiment.

The first embodiment of embodiments of the present disclosure is intended to eliminate the influence based on the motion of a mark by appropriately setting on and of timings of the switches 131a and 131b by the FMCW TDMA MIMO radar signal processor 110. More specifically, the FMCW TDMA MIMO radar signal processor 110 sets on and off timings of the switches 131a and 131b from the FMCW TDMA MIMO radar signal processor 110 by performing repetitive transmission so that the antenna element numbers of the transmitting array antennas are anterior-posterior symmetrical centering on the reference time.

Figure 8:
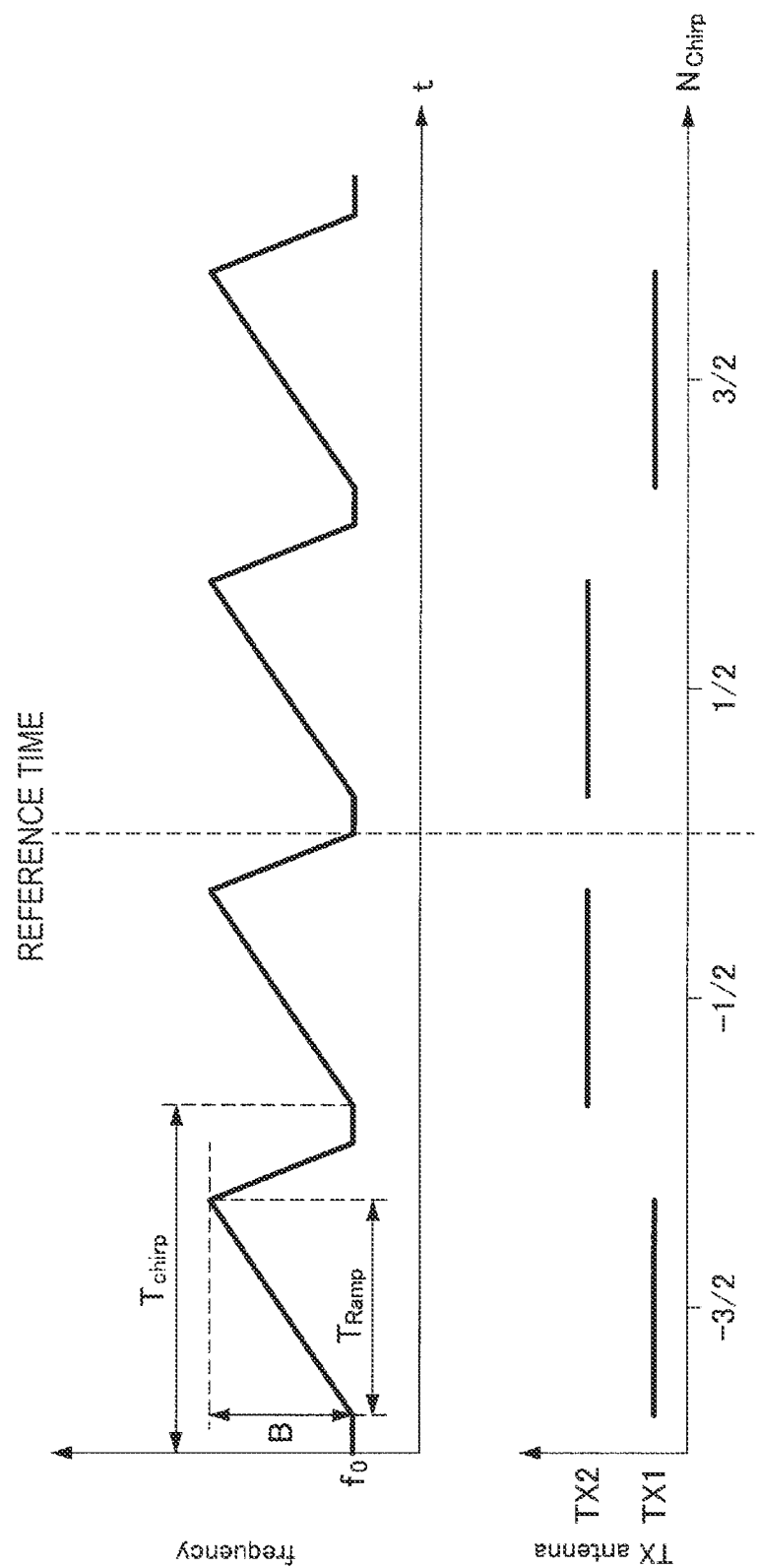
FIG. 8 is a diagram illustrated to describe a relationship between the chirp by the local oscillator of the FMCW TDMA MIMO radar device 100 and the timing of selecting the transmitting antennas 140$a$ and 140$b$ using the switches 131$a$ and 131$b$.

FIG. 8 is a diagram illustrated to describe the relationship between the chirp by the local oscillator of the FMCW TDMA MIMO radar device 100 and the timing of selecting the transmitting antennas 140a and 140b by the switches 131a and 131b. $T_{Chirp}$ is one cycle of chirp. $T_{Ramp}$ is ramp time of chirp, $f_0$ is chirp start frequency, B is chirp bandwidth, and $N_{Chirp}$ is an index representing the correlation of chirp.

As illustrated in FIG. 8, the FMCW TDMA MIMO radar signal processor 110 controls the switches 131a and 131b to be turned on or off so that the transmitting antennas 140b, 140a, 140a, and 140b are selected in this order and perform transmission by setting a certain reference time as the center. In this way, the description is given of that it is possible to eliminate the influence based on the motion of the target by performing repetitive transmission so that the antenna elements numbers of the transmitting array antennas are anterior-posterior symmetrical centering on the reference time.

First, the beat signal received by the virtual array antenna that is constructed by two times of transmission of $N_{Chirp}=-3/2$ and $N_{Chirp}=-1/2$ before the reference time is referred to as a first beat signal $S_{B1}$. The first beat signal $S_{B1}$ and the mode vector of the transmitting array antenna of the first beat signal $S_{B1}$ are respectively given to Formula 9 and Formula 10, where A1 represents the amplitude.

[Math. 9]

$$S_{B1} \approx A_1 \cdot a_{TX1}(\theta) \otimes a_{RX}(\theta) \cdot \exp\left[j2\pi\left\{(f_R - f_D)t + f_0\frac{2R_0}{c_0}\right\}\right] \quad \text{(Formula 9)}$$

[Math. 10]

$$a_{TX1}(\theta) = \begin{bmatrix} \exp\left(j2\pi f_0 \frac{3VT_{Chirp}}{c_0}\right)\exp\left(j2\pi f_0 \frac{0d\sin(\theta)}{c_0}\right) \\ \exp\left(j2\pi f_0 \frac{1VT_{Chirp}}{c_0}\right)\exp\left(j2\pi f_0 \frac{3d\sin(\theta)}{c_0}\right) \end{bmatrix} \quad \text{(Formula 10)}$$

Next, the beat signal received by the virtual array antenna that is constructed by two times of transmission of $N_{Chirp}=1/2$ and $N_{Chirp}=3/2$ after the reference time is referred to as a second beat signal $S_{B2}$. The second beat signal $S_{B2}$ and the mode vector of the transmitting array antenna of the second beat signal $S_{B2}$ are respectively given to Formula 11 and Formula 12, where A2 represents the amplitude.

[Math. 11]

$$S_{B2} \approx A_2 \cdot a_{TX2}(\theta) \otimes a_{RX}(\theta) \cdot \exp\left[j2\pi\left\{(f_R - f_D)t + f_0\frac{2R_0}{c_0}\right\}\right] \quad \text{(Formula 11)}$$

[Math. 12]

$$a_{TX2}(\theta) = \begin{bmatrix} \exp\left(-j2\pi f_0 \frac{3VT_{Chirp}}{c_0}\right)\exp\left(j2\pi f_0 \frac{0d\sin(\theta)}{c_0}\right) \\ \exp\left(-j2\pi f_0 \frac{1VT_{Chirp}}{c_0}\right)\exp\left(j2\pi f_0 \frac{3d\sin(\theta)}{c_0}\right) \end{bmatrix} \quad \text{(Formula 12)}$$

The FMCW TDMA MIMO radar signal processor 110 performs signal processing of synthesizing the beat signals at the reference time by using the first beat signal SB1 and the second beat signal SB2. Specifically, the FMCW TDMA MIMO radar signal processor 110 performs the signal processing of synthesizing the beat signals at the reference time from an average of amplitudes of the first beat signal $S_{B1}$ and the second beat signal Sn for each transmitting antenna and a phase of the sum of the first beat signal $S_{B1}$ and the second beat signal $S_{B2}$, as expressed by Formula 13.

[Math. 13]

$$\hat{S}_B = \frac{|S_{B1}| + |S_{B2}|}{2}\exp[j\arg(S_{B1} + S_{B2})] \quad \text{(Formula 13)}$$

The reason why the influence of motion of the target is eliminated by synthesizing the beat signals at the reference time from the average of the amplitudes of the first beat signal $S_{B1}$ and the second beat signal $S_{B2}$ and the phase of the sum of the first beat signal $S_{B1}$ and the second beat signal $S_{B2}$ is described.

Formula 9 and Formula 11 are substituted respectively into $S_{B1}$ and $S_{B2}$ in Formula 13, and they are respectively arranged into Formula 14 and Formula 15.

[Math. 14]

$$\hat{S}_B = \quad \text{(Formula 14)}$$
$$\frac{A_1 + A_2}{2} \cdot \hat{a}_{TX}(\theta) \otimes a_{RX}(\theta) \cdot \exp\left[j2\pi\left\{(f_R - f_D)t + f_0\frac{2R_0}{c_0}\right\}\right]$$

-continued

[Math. 15]

$$\hat{a}_{TX}(\theta) = \exp[j\arg\{A_1 a_{TX1}(\theta) + A_2 a_{TX2}(\theta)\}] \quad \text{(Formula 15)}$$

Here, the amplitudes A1 and A2 included in Formula 15 do not change in a short time, so they can be regarded as equal. Then, Formula 10 and Formula 12 are complex conjugates. Thus, when the sum of the two mode vectors is calculated as expressed in Formula 16, the imaginary part of the Doppler phase is canceled, and only the cosine component of the real part remains in the amplitude,

[Math. 16]

$$a_{TX1}(\theta) + a_{TX2}(\theta) = \quad \text{(Formula 16)}$$

$$\begin{bmatrix} 2\cos\left(2\pi f_0 \frac{3VT_{Chirp}}{c_0}\right)\exp\left(j2\pi f_0 \frac{0d\sin(\theta)}{c_0}\right) \\ 2\cos\left(2\pi f_0 \frac{1VT_{Chirp}}{c_0}\right)\exp\left(j2\pi f_0 \frac{3d\sin(\theta)}{c_0}\right) \end{bmatrix}$$

If the cosine component in Formula 16 is larger than zero, the calculation of Formula 15 is possible. Thus, if the velocity region represented in Formula 17 is satisfied, the FMCW TDMA MIMO radar signal processor 110 according to the present embodiment is capable of compensating the Doppler phase.

[Math. 17]

$$V < \frac{c_0}{4 \cdot 3 f_0 T_{Chirp}} \quad \text{(Formula 17)}$$

Figure 9:
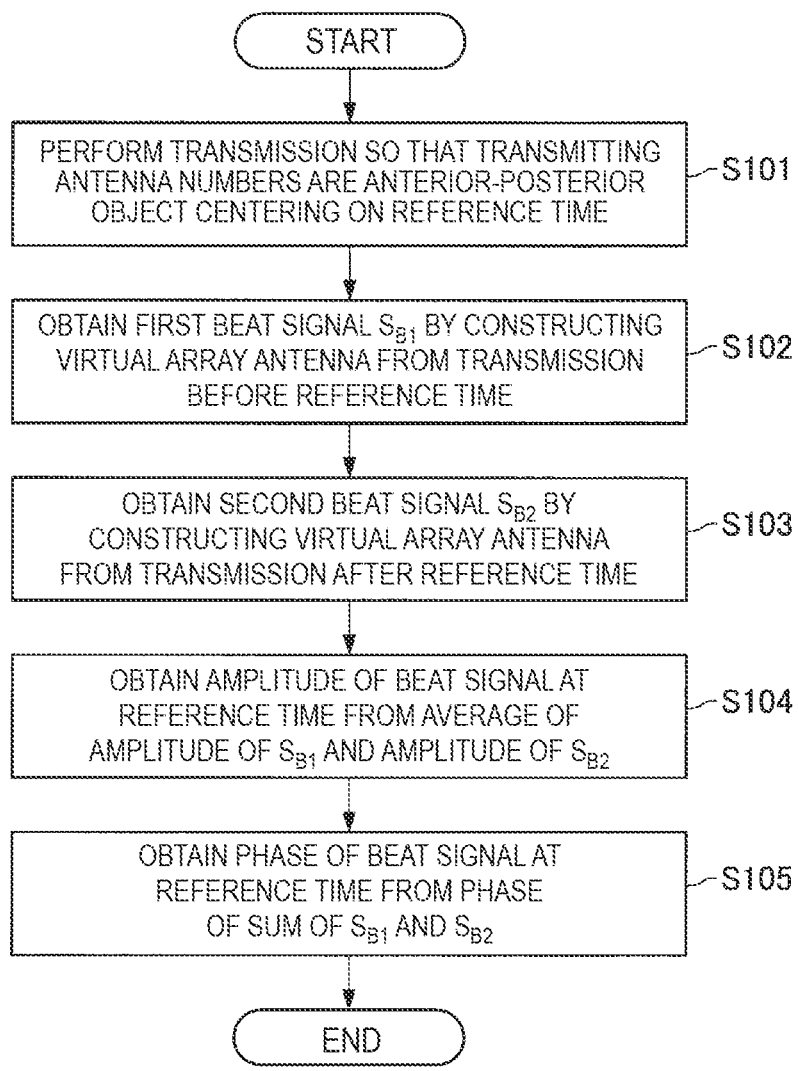
FIG. 9 is a flowchart illustrating an operation example of the FMCW TDMA MIMO radar device 100 according to an embodiment of the present disclosure.

FIG. 9 is a flowchart illustrating an operation example of the FMCW TDMA MIMO radar device 100 according to the embodiment of the present disclosure. The operation example of the FMCW TDMA MIMO radar device 100 according to the embodiment of the present disclosure is now described with reference to FIG. 9.

First, the FMCW TDMA MIMO radar device 100 performs transmission so that the transmitting antenna numbers are the anterior-posterior object centering on the reference time (step S101). This transmission processing is executed by the transmission processing unit 130 upon receipt of the switching control signal from the FMCW TDMA MIMO radar signal processor 110.

Subsequently, the FMCW TDMA MIMO radar device 100 obtains the first beat signal $S_{B1}$ by constructing the virtual array antenna from the transmission before the reference time (step S102). In addition, the FMCW TDMA MIMO radar device 100 obtains the second beat signal $S_{B2}$ by constructing the virtual array antenna from the transmission after the reference time (step S103). Of course, the order of obtaining the first beat signal $S_{B1}$ and the second beat signal $S_{B2}$ may be reversed.

Subsequently, the FMCW TDMA MIMO radar device 100 obtains the amplitude of the beat signal at the reference time by averaging the amplitude of the first beat signal $S_{B1}$ and the amplitude of the second beat signal $S_{B2}$ (step S104). In addition, the FMCW TDMA MIMO radar device 100 obtains the phase of the beat signal at the reference time from the phase of the sum of the first beat signal $S_{B1}$ and the second beat signal $S_{B2}$ (step S105). Of course, the order of obtaining the amplitude and phase of the beat signal at the reference time may be reversed.

The FMCW TDMA MIMO radar device 100 according to the embodiment of the present disclosure that executes such a series of operations makes it possible to eliminate the influence of the motion of the target by compensating the Doppler phase.

Figure 10:
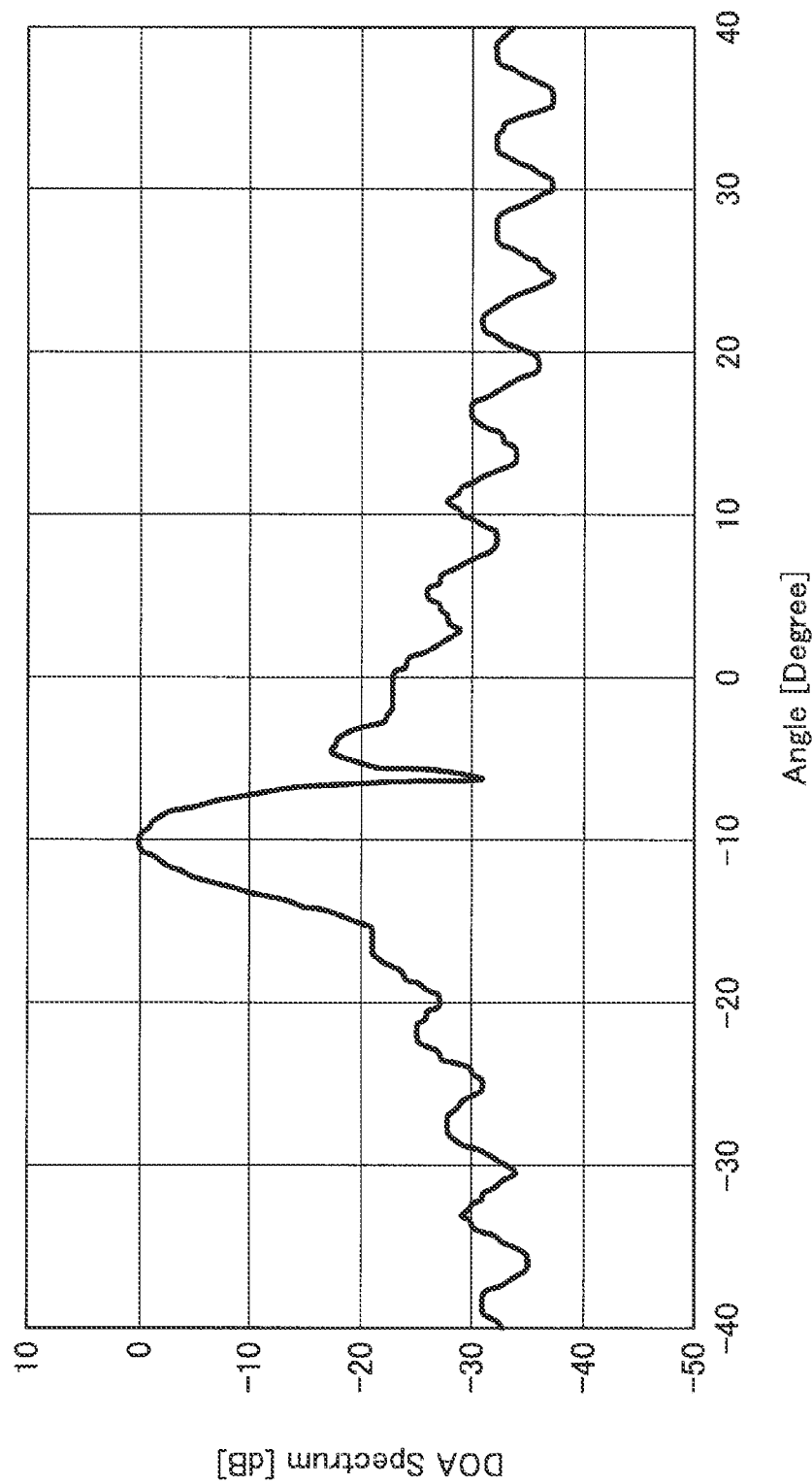
FIG. 10 is a diagram illustrated to describe effects of a first embodiment of the embodiment of the present disclosure.
Figure 11:
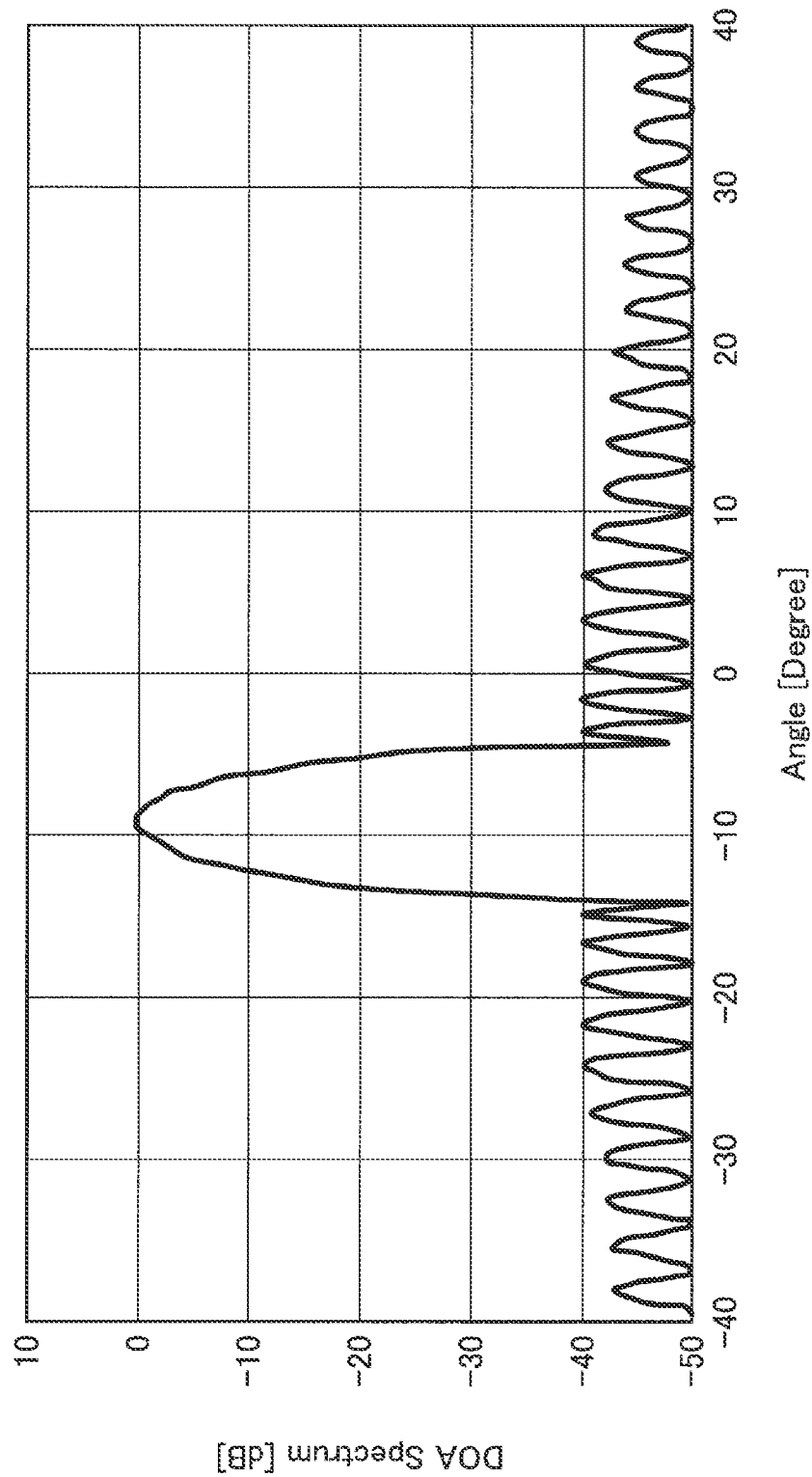
FIG. 11 is a diagram illustrated to describe effects of the first embodiment of the embodiment of the present disclosure.

The effects of the first embodiment are described by using parameters shown in Table 1 below. FIGS. 10 and 11 are diagrams illustrated to describe effects of the first embodiment of the embodiments of the present disclosure. FIG. 10 illustrates the azimuth spectrum in a case where the Doppler phase is not compensated. FIG. 11 illustrates the azimuth spectrum in the case where the FMCW TDMA MIMO radar device 100 according to the embodiment of the present disclosure compensates the Doppler phase.

TABLE 1

(Parameters of FMC TDMA MIMO radar device and moving target)

| Parameters | value |
|---|---|
| $f_\theta$ | 76 GHz |
| B | 1 GHz |
| $T_{Chirp}$ | 10 us |
| M | 2 |
| N | 16 |
| d | 0.65 λ |
| V | 20 m/s |
| $X_0$ | −5 m |
| $Z_0$ | 30 m |

It is found that, in the case where the Doppler phase is not compensated as illustrated in FIG. 10, the waveform of the azimuth spectrum is disturbed, whereas in the case where the Doppler phase is compensated as illustrated in FIG. 11, the waveform of the azimuth spectrum is not disturbed. Thus, the FMCW TDMA MIMO radar device 100 according to the embodiment of the present disclosure is capable of eliminating the influence of the motion of the target by compensating the Doppler phase.

Figure 12A:
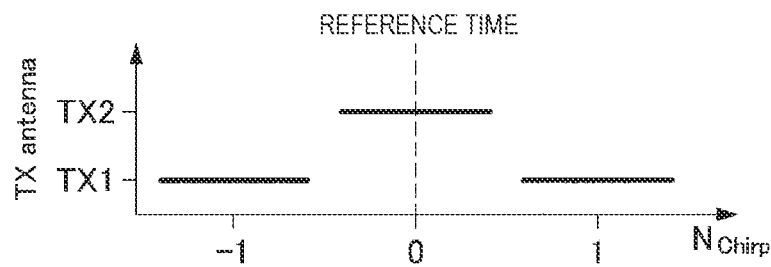
FIG. 12A is a diagram illustrated to describe an example of transmission patterns that are anterior-posterior symmetrical centering on a reference time.
Figure 12B:
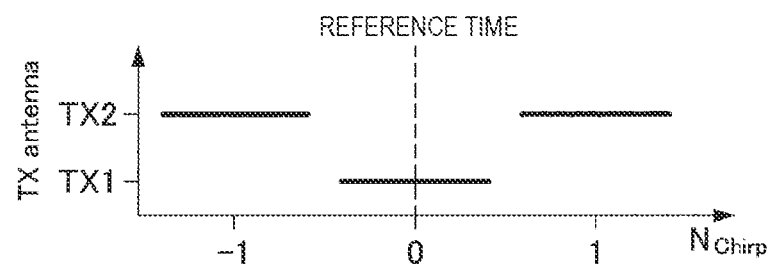
FIG. 12B is a diagram illustrated to describe an example of transmission patterns that are anterior-posterior symmetrical centering on a reference time.
Figure 12C:
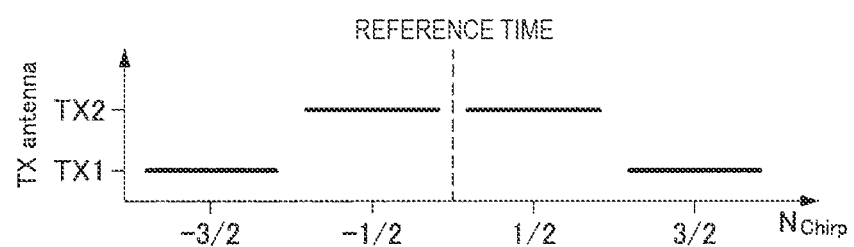
FIG. 12C is a diagram illustrated to describe an example of transmission patterns that are anterior-posterior symmetrical centering on a reference time.
Figure 12D:
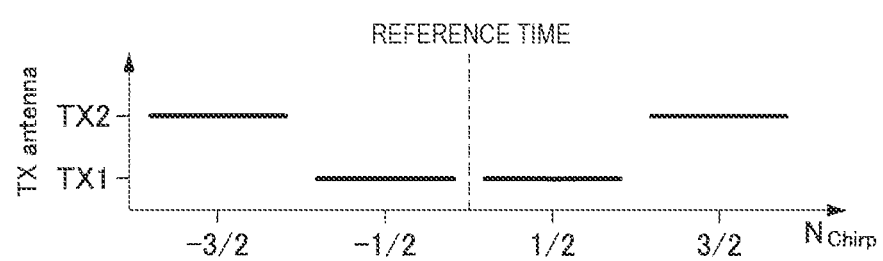
FIG. 12D is a diagram illustrated to describe an example of transmission patterns that are anterior-posterior symmetrical centering on a reference time.
Figure 12E:
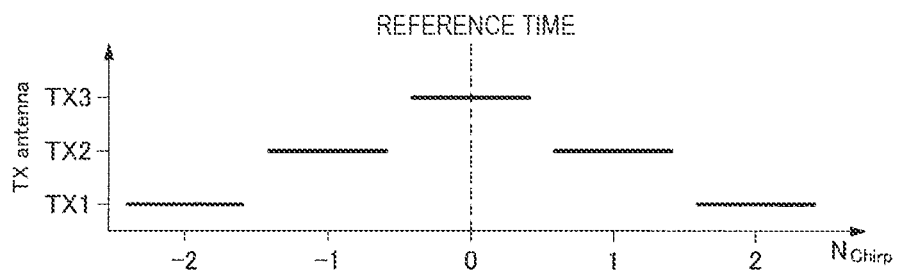
FIG. 12E is a diagram illustrated to describe an example of transmission patterns that are anterior-posterior symmetrical centering on a reference time.
Figure 12F:
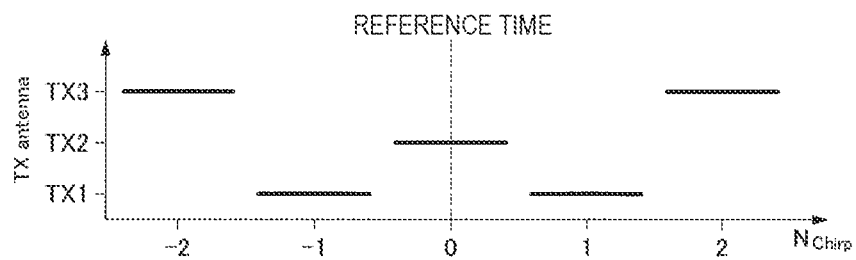
FIG. 12F is a diagram illustrated to describe an example of transmission patterns that are anterior-posterior symmetrical centering on a reference time.

FIGS. 12A to 12F are diagrams illustrated to describe examples of a transmission pattern in which the transmitting array antennas are anterior-posterior symmetrical centering on the reference time in cases where the transmitting array antenna is two elements and three elements. FIGS. 12A to 12D are examples of the transmission pattern in the case where the transmitting array antenna is two elements, and FIGS. 12E to 12F are examples of the transmission pattern in the case where the transmitting array antenna is three elements. Of course, the transmission pattern is not limited to those illustrated in FIGS. 12A to 12F. In addition, as illustrated in FIGS. 12A to 12B and FIGS. 12E to 12F, it may be a transmission pattern transmitted from any one of the transmitting antennas across the reference time, and it may be a transmission pattern that is not transmitted from any of the transmitting antennas at the reference time as illustrated in FIGS. 12C to 12D.

1.3. Second Embodiment

A second embodiment is subsequently described. In the signal processing for removing the Doppler phase that is described in the first embodiment, the beat signals $S_{B1}$ and $S_{B2}$ are used as a time signal. However, this signal processing can be performed in the frequency spectrum in a similar way. In the FMCW radar device, it is common practice to convert the beat signal into a frequency spectrum by performing a discrete Fourier transform on the beat signal, so it is very preferable to remove the Doppler phase in the frequency domain.

In the case of removing the Doppler phase in the frequency domain, the signal processing is performed on the beat signals $S_{B1}$ and $S_{B2}$ subjected to discrete Fourier as expressed in Formula 18 below.

[Math. 18]

$$F[\tilde{S}_B] = \tfrac{1}{2}(|F[S_{B1}]| + |F[S_{B2}]|) \cdot \exp[j\,\arg(F[S_{B1}] + F[S_{B2}])] \quad \text{(Formula 18)}$$

FIG. 13 is a flowchart illustrating an operation example of the FMCW TDMA MIMO radar device 100 according to the embodiment of the present disclosure. The operation example of the FMCW TDMA MIMO radar device 100 according to the embodiment of the present disclosure is now described with reference to FIG. 13.

First, the FMCW TDMA MIMO radar device 100 performs transmission so that the transmitting antenna numbers are the anterior-posterior object centering on the reference time (step S111). This transmission processing is executed by the transmission processing unit 130 upon receipt of the switching control signal from the FMCW TDMA MIMO radar signal processor 110.

Subsequently, the FMCW TDMA MIMO radar device 100 obtains the first beat signal Sit by constructing the virtual array antenna from the transmission before the reference time, and further converts it into the frequency spectrum by performing the discrete Fourier transform (step S112). In addition, the FMCW TDMA MIMO radar device 100 obtains the second beat signal $S_{B2}$ by constructing the virtual array antenna from the transmission after the reference time, and further converts it into the frequency spectrum by performing the discrete Fourier transform (step S113). Of course, the order of obtaining the first beat signal $S_{B1}$ and the second beat signal $S_{B2}$ may be reversed.

Subsequently, the FMCW TDMA MIMO radar device 100 obtains the amplitude of the frequency spectrum of the beat signal at the reference time by averaging the amplitude of the first beat signal $S_{B1}$ and the amplitude of the frequency spectrum of the second beat signal $S_{B2}$ (step S114). In addition, the FMCW TDMA MIMO radar device 100 obtains the phase of the frequency spectrum of the beat signal at the reference time from the phase of the sum of the frequency spectra of the first beat signal $S_{B1}$ and the second beat signal $S_{B2}$ (step S115). Of course, the order of obtaining the amplitude and phase of the frequency spectrum of the beat signal at the reference time may be reversed.

The FMCW TDMA MIMO radar device 100 according to the embodiment of the present disclosure that executes such a series of operations makes it possible to eliminate the influence of the motion of the target by compensating the Doppler phase in the frequency domain.

1.4. Third Embodiment

The signal processing described in the first embodiment, in a case where the cosine component of Formula 16 becomes zero, fails to perform the operation for obtaining the angle of Formula 15, so the beat signals at the reference time fail to be synthesized. Thus, in the third embodiment, a third beat signal $S_{B3}$ is obtained by averaging the first beat signal $S_{B1}$ and the second beat signal $S_{B2}$, and the amplitude of the third beat signal $S_{B3}$ is compared with the amplitude of the first beat signal $S_{B1}$, so in a case where the amplitude ratio is smaller than a predetermined threshold value (e.g., 1/10 or less), the signal processing is not performed.

Figure 14:
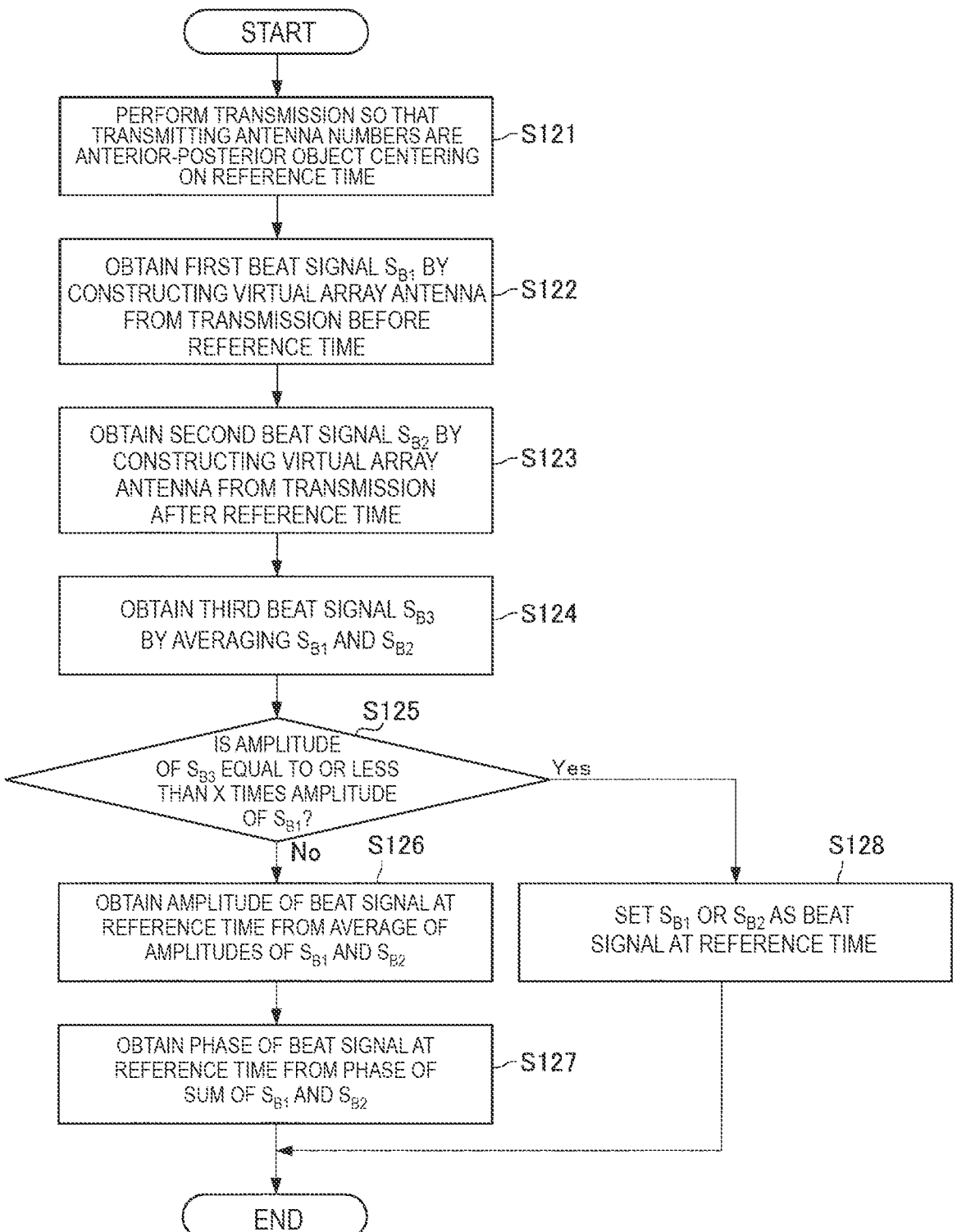
FIG. 14 is a flowchart illustrating an operation example of the FMCW TDMA MIMO radar device 100 according to the embodiment of the present disclosure.

FIG. 14 is a flowchart illustrating an operation example of the FMCW TDMA MIMO radar device 100 according to the embodiment of the present disclosure. The operation example of the FMCW TDMA MIMO radar device 100 according to the embodiment of the present disclosure is now described with reference to FIG. 14.

First, the FMCW TDMA MIMO radar device 100 performs transmission so that the transmitting antenna numbers are the anterior-posterior object centering on the reference time (step S121). This transmission processing is executed by the transmission processing unit 130 upon receipt of the switching control signal from the FMCW TDMA MIMO radar signal processor 110.

Subsequently, the FMCW TDMA MIMO radar device 100 obtains the first beat signal $S_{B1}$ by constructing the virtual array antenna from the transmission before the reference time (step S122). In addition, the FMCW TDMA MIMO radar device 100 obtains the second beat signal $S_{B2}$ by constructing the virtual array antenna from the transmission after the reference time (step S123). Of course, the order of obtaining the first beat signal $S_{B1}$ and the second beat signal $S_{B2}$ may be reversed.

Subsequently, the FMCW TDMA MIMO radar device 100 obtains the third beat signal $S_{B3}$ by averaging the first beat signal $S_{B1}$ and the second beat signal $S_{B2}$ (step S124).

Subsequently, the FMCW TDMA MIMO radar device 100 determines whether or not the amplitude of the third beat signal $S_{B3}$ is equal to or less than X times (X is a predetermined threshold value) the amplitude of the first beat signal $S_{B1}$ (step S125).

If the amplitude of the third beat signal $S_{B3}$ is more than X times (X is a predetermined threshold value) the amplitude of the first beat signal $S_{B1}$ as a result of the determination in the step S125 (No in the step S125), then the FMCW TDMA MIMO radar device 100 obtains the amplitude of the beat signal at the reference time by averaging the amplitude of the first beat signal Sa and the amplitude of the second beat signal $S_{B2}$ (step S126). In addition, the FMCW TDMA MIMO radar device 100 obtains the phase of the beat signal at the reference time from the phase of the sum of the first beat signal $S_{B1}$ and the second beat signal $S_{B2}$ (step S127). Of course, the order of obtaining the amplitude and phase of the beat signal at the reference time may be reversed.

On the other hand, if the amplitude of the third beat signal $S_{B3}$ is equal to or less than X times (X is a predetermined threshold value) the amplitude of the first beat signal $S_{B1}$ as a result of the determination in step S125 (Yes in step S125), then the FMCW TDMA MIMO radar device 100 performs the processing on one of the first beat signal $S_{B1}$ or the second beat signal $S_{B2}$ by setting it as the beat signal at the reference time (step S128).

1.5. Fourth Embodiment

In the signal processing described in the first embodiment, in one example, as illustrated in FIG. 8, the beat signal at the reference time can be obtained by four times of transmission. On the other hand, in the FMCW TDMA MIMO radar device in related art, as illustrated in FIG. 6, the beat signal can be obtained by two times of transmission. Thus, the signal processing described in the first embodiment takes twice the time as compared with the signal processing in related art.

Figure 15:
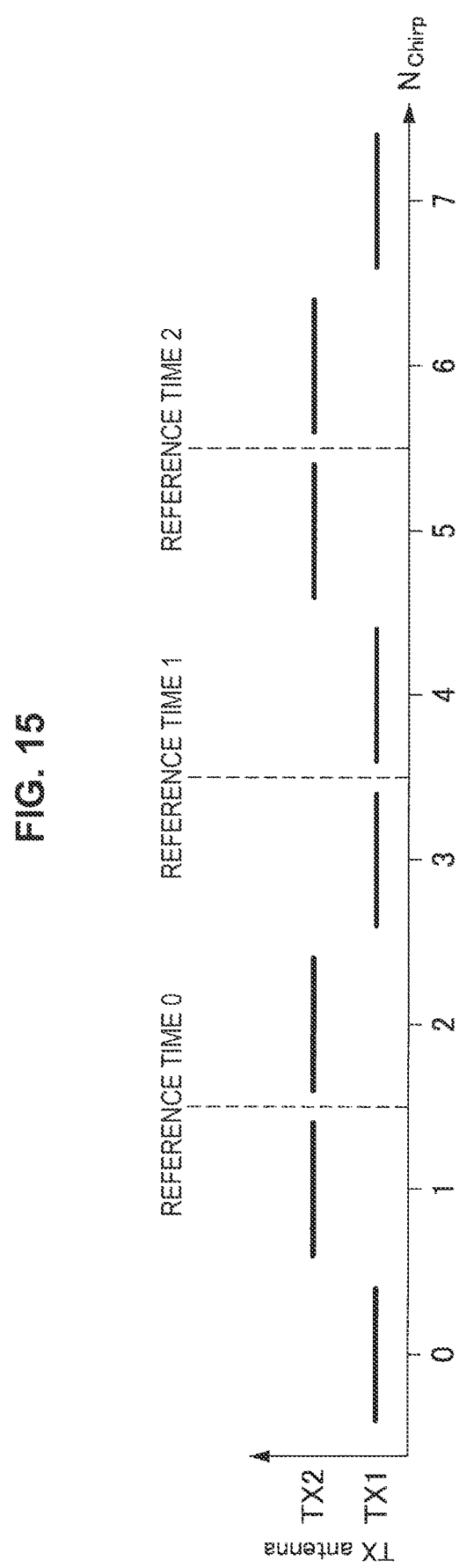
FIG. 15 is a diagram illustrated to describe a relationship between timings at which transmitting antennas 140$a$ and 140$b$ are selected using switches 131$a$ and 131$b$.

Thus, the fourth embodiment describes an example of shortening the time taken for the signal processing. FIG. 15 is a diagram illustrated to describe a relationship between timings at which the transmitting antennas 140*a* and 140*b* are selected by the switches 131*a* and 131*b*. As illustrated in FIG. 15, the FMCW TDMA MIMO radar device 100 synthesizes the beat signals at a reference time 0 from $N_{Chirp}$=0, 1, 2, and 3, and synthesizes the beat signals at a reference time 1 from $N_{Chirp}$=2, 3, 4, and 5, then synthesizes the beat signals at a reference time 2 from $N_{Chirp}$=4, 5, 6, and 7.

The synthesis of the beat signals in this way makes it possible for the FMCW TDMA MIMO radar device 100 according to the embodiment of the present disclosure to output the beat signal at the same time intervals as those in related art.

1.6. Application Example

The FMCW TDMA MIMO radar device 100 according to the embodiment of the present disclosure is capable of eliminating the influence based on the motion of the target, so it is suitably applicable to a radar device in a system that supports safe driving of a vehicle, which necessitates range measurement with high accuracy.

Figure 16:
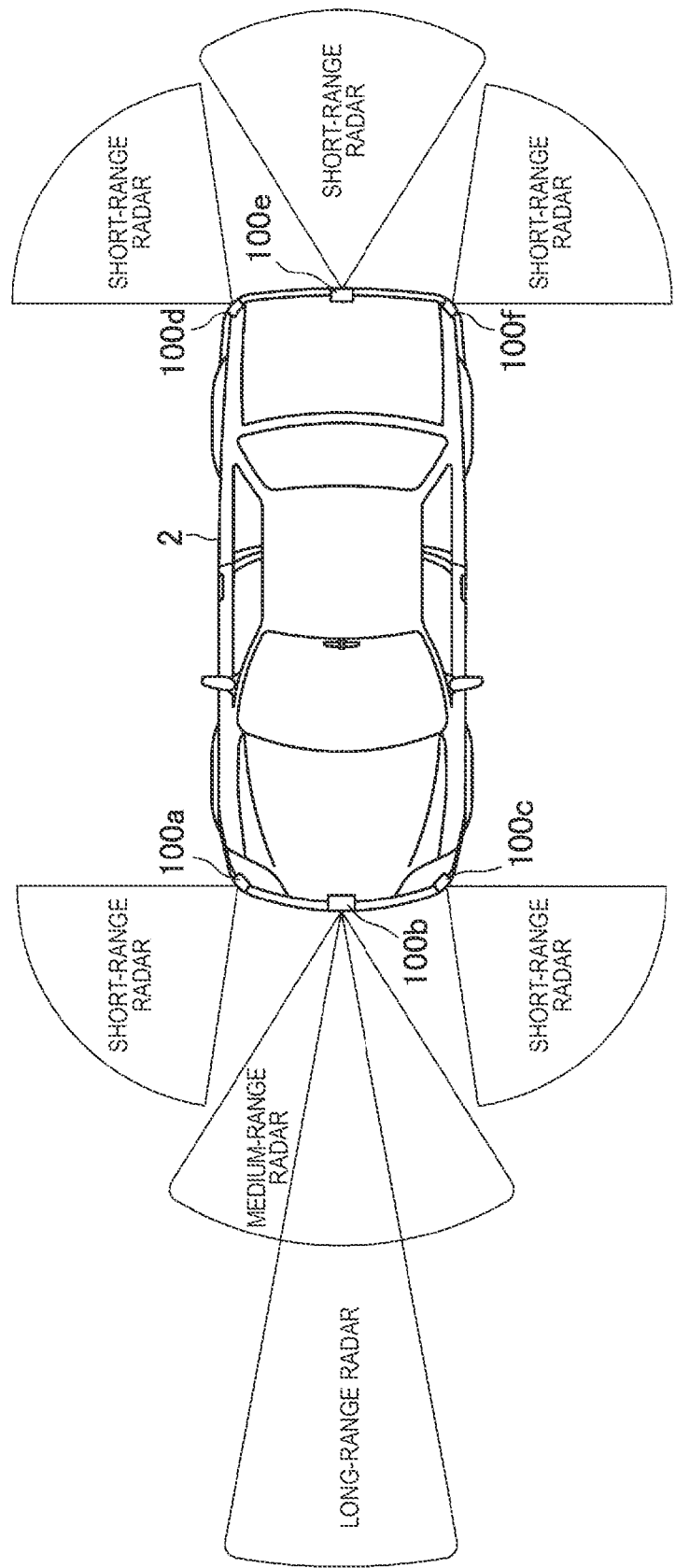
FIG. 16 is a diagram illustrated to describe an example of a vehicle 2 on which FMCW TDMA MIMO radar devices 100$a$ to 100$f$ are mounted.

FIG. 16 is a diagram illustrated to describe an example of a vehicle 2 on which the FMCW TDMA MIMO radar devices 100*a* to 100*f* are mounted. The FMCW TDMA MIMO radar devices 100*a* to 100*f* illustrated in FIG. 16 are assumed to be any of the FMCW TDMA MIMO radar devices 100 according to the embodiment of the present disclosure described above. The FMCW TDMA MIMO radar devices 100*a* to 100*f* are any of radar devices for short-range, medium-range, and long-range, and are used for detecting an object or the like around the vehicle 2.

In this way, the FMCW TDMA MIMO radar device 100 according to the embodiment of the present disclosure is applicable as a radar device in the system supporting safe driving of the vehicle as described above, so it is possible to contribute to higher performance of the system described above.

2. CONCLUDING REMARKS

According to the embodiment of the present disclosure as described above, it is possible to provide the FMCW TDMA MIMO radar device 100 capable of performing repetitive transmission so that the antenna element numbers of the transmitting array antenna are anterior-posterior symmetrical centering on a predetermined reference time and synthesizing the beat signals at the reference time from the beat signal before the reference time and the beat signal after the reference time, thereby eliminating the influence based on the motion of the target.

The respective steps in the processing executed by each apparatus in this specification are not necessarily processed in chronological order in accordance with the sequences listed in the sequence diagrams or flowcharts. In one example, the respective steps in the process executed by each apparatus may be processed in an order different from the sequences listed in the flowcharts, or may be processed in parallel.

Further, it is also possible to create a computer program for causing the hardware such as CPU, ROM, and RAM incorporated in each apparatus to implement functions equivalent to those of components of each apparatus described above. In addition, it is possible to provide a storage medium having the relevant computer program stored therein. In addition, each functional block shown in the functional block diagrams can be implemented by hardware or hardware circuitry that allows a series of processing operations to be performed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A radar device including:
M (M≥2) number of transmitting antennas;
N (N≥1) number of receiving antennas;
a local oscillator configured to oscillate a local signal;
a transmission processing unit configured to transmit a transmission signal based on the local signal by selecting any one of the transmitting antennas;
a reception processing unit configured to output a beat signal from an echo signal obtained from the transmission signal reflected by a target and the local signal, the echo signal being received by the receiving antennas; and
a signal processing unit configured to perform signal processing on the beat signal,
in which the transmission processing unit allows the transmitting antennas to perform transmission by performing sequential switching such that antenna element numbers are anterior-posterior symmetrical centering on a reference time, and
the signal processing unit synthesizes a beat signal at the reference time from a first beat signal received by the receiving antenna before the reference time and a second beat signal received after the reference time.

(2)
The radar device according to (1),
in which the signal processing unit obtains an amplitude of the beat signal at the reference time by averaging an amplitude of the first beat signal and an amplitude of the second beat signal and obtains a phase of the beat signal at the reference time by adding a phase of the first beat signal and a phase of the second beat signal.

(3)
The radar device according to (1),
in which the signal processing unit synthesizes a frequency spectrum of the beat signal at the reference time from a first frequency spectrum obtained by performing discrete Fourier transform on the first beat signal and a second frequency spectrum obtained by performing the discrete Fourier transform on the second beat signal.

(4)
The radar device according to any of (1) to (3),
in which the signal processing unit, if an average of an amplitude of the first beat signal and an amplitude of the second beat signal is equal to or less than a predetermined value, sets the first beat signal or the second beat signal as the beat signal at the reference time.

(5)

The radar device according to (4),
in which the predetermined value is a predetermined ratio of the amplitude of the first beat signal or the amplitude of the second beat signal.

(6)

The radar device according to any of (1) to (5),
in which the radar device is mounted on a vehicle.

(7)

A signal processor including:
a signal processing unit configured to perform signal processing on a beat signal generated from an echo signal obtained from a transmission signal that is transmitted from M (M≥2) number of transmitting antennas and reflected by a target and a local signal, the transmission signal being based on the local signal,
in which the signal processing unit causes the transmitting antennas to perform transmission by performing sequential switching such that antenna element numbers are anterior-posterior symmetrical centering on a reference time, and
synthesizes a beat signal at the reference time from a first beat signal received by the receiving antenna before the reference time and a second beat signal received after the reference time.

(8)

A signal processing method including;
causing M (M≥2) number of transmitting antennas to transmit a transmission signal based on a local signal by performing sequential switching such that antenna element numbers are anterior-posterior symmetrical centering on a reference time; and
performing signal processing on a beat signal generated from an echo signal obtained from the transmission signal that is transmitted from the transmitting antennas and reflected by a target and the local signal,
in which the performing of the signal processing includes synthesizing a beat signal at the reference time from a first beat signal received by the receiving antenna before the reference time and a second beat signal received after the reference time.

REFERENCE SIGNS LIST

100 FMCW TDMA MIMO radar device

What is claimed is:

1. A radar device, comprising:
   at least two transmitting antennas;
   at least one receiving antenna;
   a local oscillator, wherein the local oscillator outputs a local signal;
   a transmission processing unit, wherein the transmission processing unit sequentially transmits the local signal as a transmission signal from a selected one of the transmitting antennas such that the transmitting antenna transmission times are anterior-posterior symmetrical centered on a reference time;
   a reception processing unit, wherein the reception processing unit outputs a beat signal from an echo signal obtained from a reflection of the transmission signal from a target and the local signal, and wherein the echo signal is received by the receiving antenna; and
   a signal processing unit that performs signal processing on the beat signal, wherein the signal processing unit synthesizes a synthesized beat signal at the reference time from a first beat signal received by the receiving antenna before the reference time and a second beat signal received after the reference time.

2. The radar device according to claim 1, wherein the signal processing unit obtains an amplitude of the synthesized beat signal at the reference time by averaging an amplitude of the first beat signal and an amplitude of the second beat signal and obtains a phase of the synthesized beat signal at the reference time by adding a phase of the first beat signal and a phase of the second beat signal.

3. The radar device according to claim 1, wherein the signal processing unit synthesizes a frequency spectrum of the synthesized beat signal at the reference time from a first frequency spectrum obtained by performing discrete Fourier transform on the first beat signal and a second frequency spectrum obtained by performing the discrete Fourier transform on the second beat signal.

4. The radar device according to claim 1, wherein the signal processing unit sets the first beat signal or the second beat signal as the synthesized beat signal at the reference time if an average of an amplitude of the first beat signal and an amplitude of the second beat signal is equal to or less than a predetermined value.

5. The radar device according to claim 4, wherein the predetermined value is a predetermined ratio of the amplitude of the first beat signal or the amplitude of the second beat signal.

6. The radar device according to claim 1, wherein the radar device is mounted on a vehicle.

7. The radar device according to claim 1, further comprising:
   a plurality of switches, wherein one switch is provided for each of the transmission antennas, and wherein each switch is selectively connected to the local oscillator by the transmission processing unit.

8. The radar device according to claim 7, further comprising:
   a plurality of power amplifiers, wherein at least one power amplifier is located between each switch and each respective transmission antenna.

9. The radar device according to claim 1, further comprising:
   a plurality of receiving antennas.

10. The radar device according to claim 9, further comprising:
    a plurality of mixers, wherein one mixer is provided for each of the receiving antennas.

11. The radar device according to claim 1, wherein the local signal output by the local oscillator increases linearly from a chirp start frequency over a ramp time.

12. The radar device according to claim 11, wherein each transmission signal is transmitted for a time period that is equal to the ramp time.

13. A signal processor, comprising:
    a signal processing unit configured to perform signal processing on a beat signal generated from an echo signal obtained from a reflection of a transmission signal that is sequentially transmitted from each transmitting antenna in a plurality of transmitting antennas at times that are anterior-posterior symmetrical centered around a reference time from a target and a local signal, the transmission signal being based on the local signal, wherein the signal processing unit synthesizes a synthesized beat signal at the reference time from a first beat signal received by the receiving antenna before the reference time and a second beat signal received after the reference time.

14. A signal processing method, comprising:
    transmitting a local signal from a plurality of transmitting antennas by performing sequential switching such that transmission times of the transmitting antennas are anterior-posterior symmetrical centered around a reference time;

generating a first beat signal, wherein the first beat signal is generated by mixing the local signal with received signals received by at least a first receiving antenna generated from an echo signal obtained from a reflection of each of a first number of the transmission signals that are transmitted before the reference time;

generating a second beat signal, wherein the second beat signal is generated by mixing the local signal with received signals received by at least the first receiving antenna generated from an echo signal obtained from a reflection of each of the first number of the transmission signals that are transmitted after the reference time; and outputting a distance and an azimuth angle to a target.

* * * * *